US012640984B2

(12) United States Patent
Shem-Tov et al.

(10) Patent No.: US 12,640,984 B2
(45) Date of Patent: *May 26, 2026

(54) CONNECTIVITY AWARE PATH FINDING

(71) Applicant: ECI Telecom Ltd., Petah Tikva (IL)

(72) Inventors: Ziv Shem-Tov, Ramat Hasharon (IL); Efraim Gelman, Ramat Gan (IL); Inbal Hecht, Petah Tikva (IL); Shirel Ezra, Ganei Tal (IL)

(73) Assignee: ECI Telecom Ltd., Petah Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/680,820

(22) Filed: May 31, 2024

(65) Prior Publication Data

US 2024/0323085 A1      Sep. 26, 2024

Related U.S. Application Data

(63) Continuation of application No. 18/356,054, filed on Jul. 20, 2023, now Pat. No. 12,063,147.

(60) Provisional application No. 63/479,845, filed on Jan. 13, 2023.

(51) Int. Cl.
H04L 41/12          (2022.01)
H04L 41/082        (2022.01)
(52) U.S. Cl.
CPC ............ H04L 41/082 (2013.01); H04L 41/12 (2013.01)
(58) Field of Classification Search
None
See application file for complete search history.

(56) References Cited

U.S. PATENT DOCUMENTS

| | | | |
|---|---|---|---|
| 5,629,859 A | 5/1997 | Agarwala et al. | |
| 11,595,294 B1 * | 2/2023 | Shem-Tov | H04L 45/22 |
| 2004/0236762 A1 | 11/2004 | Chaudhuri et al. | |
| 2007/0006197 A1 * | 1/2007 | Murphy | G06F 8/43 |
| | | | 717/151 |
| 2009/0097418 A1 * | 4/2009 | Castillo | H04L 41/147 |
| | | | 370/255 |

(Continued)

OTHER PUBLICATIONS

BJörklund, Andreas et al., "Shortest Cycle Through Specified Elements", Philadelphia: Society for Industrial and Applied Mathematics, (2012), pp. 1747-1753.

*Primary Examiner* — Thu N Nguyen
(74) *Attorney, Agent, or Firm* — Finnegan, Henderson, Farabow, Garrett & Dunner LLP

(57)          ABSTRACT

Systems and methods are disclosed for configuring a communication network to satisfy a set of demands. A network management system can obtain a network graph representing the communication network, connectivity relationship that indicates valid pairs of edges for each vertex in the network graph, and a structure that lacks zero divisors. The network management system can use the network graph, connectivity relationship, and structure to determine a path length for which a valid path connecting a source vertex and a terminal vertex exists. The path length can be determined using a dynamic programming approach that associates an element of the structure with the collection of paths connecting the source vertex and the terminal vertex. The network management system can then use the network graph, connectivity relationship, and structure to determine a valid path of the path length that connects the source vertex and the terminal vertex.

20 Claims, 17 Drawing Sheets

500

Obtain a network graph representing a communications network, a connectivity set for the network graph, a demand on the network graph, and a structure.
510

Assign elements in the structure to the connectivity set.
520

Identify a path length for which a valid path exists between a source vertex and a terminal vertex of the demand using the connectivity set and the assigned elements of the structure.
530

Determine a valid path of the identified path length between the source vertex and the terminal vertex of demand using the connectivity set and the assigned elements of the structure.
540

Configure the communications network to satisfy the demand using the valid path.
550

(56) References Cited

U.S. PATENT DOCUMENTS

| | | | |
|---|---|---|---|
| 2015/0067302 A1* | 3/2015 | Gueron | G06F 9/3887 |
| | | | 712/210 |
| 2016/0330226 A1* | 11/2016 | Chen | H04L 63/14 |
| 2019/0236848 A1* | 8/2019 | Wallis | H04L 41/12 |
| 2022/0021591 A1 | 1/2022 | Biswas et al. | |
| 2022/0210072 A1* | 6/2022 | Dutta | H04L 47/125 |

* cited by examiner

300

Edge 303

Vertex 301

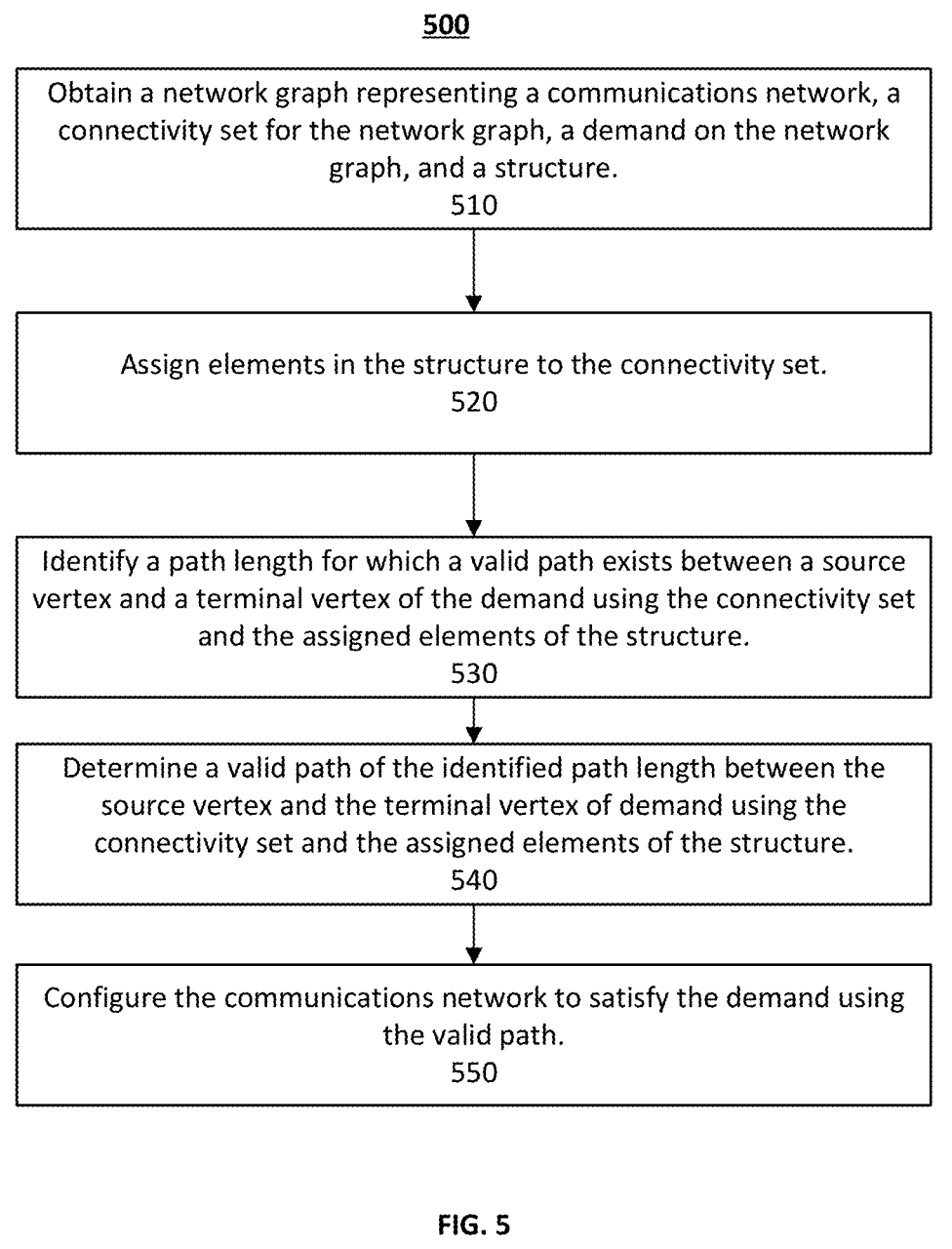

500

Obtain a network graph representing a communications network, a connectivity set for the network graph, a demand on the network graph, and a structure.
510

Assign elements in the structure to the connectivity set.
520

Identify a path length for which a valid path exists between a source vertex and a terminal vertex of the demand using the connectivity set and the assigned elements of the structure.
530

Determine a valid path of the identified path length between the source vertex and the terminal vertex of demand using the connectivity set and the assigned elements of the structure.
540

Configure the communications network to satisfy the demand using the valid path.
550

FIG. 5

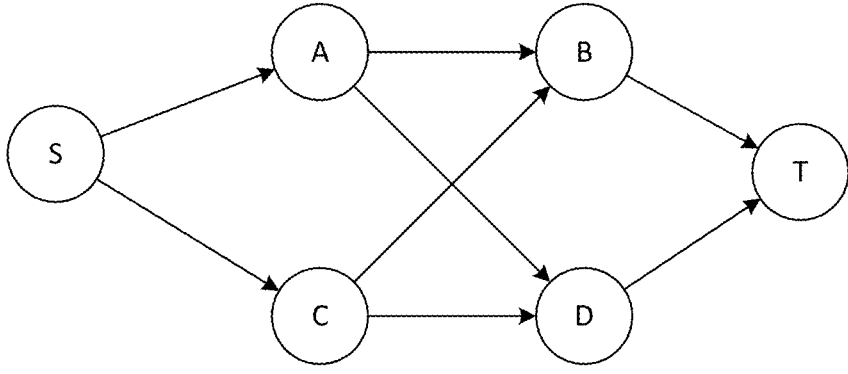

$$T_3(s,t) = f(W_3(s,e_{bt},t))+f(W_3(a,e_{dt},t))=$$
$$f(W_2(s,e_{ab},b))\cdot f(e_{ab},e_{bt})+f(W_2(s,e_{cb},b))\cdot f(e_{cb},e_{bt}) +$$
$$f(W_2(s,e_{ad},d))\cdot f(e_{ad},e_{dt})+f(W_2(s,e_{cd},d))\cdot f(e_{cd},e_{bt}) =$$
$$f(W_1(s,e_{sa},a))\cdot f(e_{sa},e_{ab})\cdot f(e_{ab},e_{bt})+f(W_1(s,e_{sc},c))\cdot f(e_{sc},e_{cb})\cdot f(e_{cb},e_{bt})+$$
$$f(W_1(s,e_{sa},a))\cdot f(e_{sa},e_{ad})\cdot f(e_{ad},e_{dt})+f(W_1(s,e_{sc},c))\cdot f(e_{sc},e_{cd})\cdot f(e_{cd},e_{dt}) =$$
$$f(e_{sa})\cdot f(e_{sa},e_{ab})\cdot f(e_{ab},e_{bt})+ f(e_{sc})\cdot f(e_{sc},e_{cb})\cdot f(e_{cb},e_{bt})+$$
$$f(e_{sa})\cdot f(e_{sa},e_{ad})\cdot f(e_{ad},e_{dt})+ f(e_{sc})\cdot f(e_{sc},e_{cd})\cdot f(e_{cd},e_{dt})$$

FIG. 6

Path 710

Path 720

Path 730

$$f(W_7(s,e_{ba},a))$$

$$f(W_7(s,e_{at},t)) = T_7(s,t)$$

$$f(W_8(s,e_{at},t)) = T_8(s,t)$$

10000

Initial Path 1301

L(s,{e_se,e_ef},t) = Null

Disabled
edge 1303

Disabled
edge 1313

Initial Path 1311

L(s,{e_se,e_ef},t) = 8

CONNECTIVITY AWARE PATH FINDING

CROSS-REFERENCE TO RELATED APPLICATIONS

The application is a continuation of U.S. patent application Ser. No. 18/356,054, filed Jul. 20, 2023, which claims priority to U.S. Provisional Application No. 63/479,845, filed on Jan. 13, 2023. These applications are incorporated herein by reference in their entireties.

TECHNICAL FIELD

The present disclosure relates to the field of communication networks and, more particularly, to systems and methods for routing in communication networks.

BACKGROUND

A communication network can be configured to satisfy demands. Such demands can include requests to communicate (or establish a communication channel, or the like) between a source node and a target node in the network. The communication network can satisfy the demands using one or more routes provided through the communication network. Each route can be implemented using hardware (e.g., transceivers, or the like) or software resources (e.g., compute, memory, or the like) of the communication network.

The communication network can be represented by a network graph including edges corresponding to communication links in the communication network and vertices corresponding to nodes in the communication network. Pathfinding techniques can identify paths on the network graph that connect vertices corresponding to the source and terminal nodes of demands on the communication network. A network management system (or the like) can then configure the communication network to satisfy the demands by implementing these paths as routes on the communication network.

However, many pathfinding techniques assume that a path entering a vertex along an edge can exit the vertex along any other edge connected to that vertex. This assumption may not hold for real-world communications networks. The devices implementing a node may be configured such that a signal entering the node along a communication link can only exit the node along a subset of the other communication links connected to the node. Existing pathfinding techniques may therefore require an additional step of confirming that paths identified on the network path can be implemented as routes on the communication network.

SUMMARY

Systems and methods are disclosed for configuring a communication network to satisfy a set of demands. A network management system can obtain a network graph representing the communication network, a connectivity relationship that indicates valid pairs of edges for each vertex in the network graph, and a structure that lacks zero divisors. The network management system can use the network graph, connectivity relationship, and structure to determine 1) a path length for which a valid path connecting a source vertex and a terminal vertex exists, and 2) a valid path of the path length that connects the source vertex and the terminal vertex.

The disclosed embodiments include a method for configuring a communications network. The method can include operations. The operations can include obtaining a network graph representing the communications network, the network graph including vertices corresponding to nodes in the communications network and edges corresponding to communications links in the communications network. The operations can include obtaining a demand on the network graph, the demand specifying a source vertex of the vertices and a terminal vertex of the vertices. The operations can include obtaining a connectivity set for the network graph, the connectivity set including elements corresponding to valid pairs of consecutive edges on the network graph. The operations can include obtaining a structure that lacks zero divisors and includes an additive identity element and additional elements. The operations can include associating pairs of consecutive edges in the network graph with elements of the structure, the association based in part on the connectivity set. The operations can include identifying a path length for which some valid path exists between the source vertex and the terminal vertex using the connectivity set and the assigned additional elements of the structure. The operations can include determining a valid path of the identified path length on the network graph using the connectivity set and the assigned additional elements of the structure. The operations can include configuring the communications network to satisfy the demand using the valid path.

The disclosed embodiments further include systems configured to perform the disclosed methods, and non-transitory, computer-readable media containing instructions for performing the disclosed methods.

The foregoing general description and the following detailed description are exemplary and explanatory only and are not restrictive of the claims.

BRIEF DESCRIPTION OF THE DRAWINGS

The accompanying drawings, which are incorporated in and constitute part of this disclosure, together with the description, illustrate and serve to explain the principles of various example embodiments.

FIG. 5 depicts an exemplary process for configuring a communications network, consistent with disclosed embodiments.

FIG. 6 depicts a network graph and the corresponding derivation of an element of the structure corresponding to the collection of paths from the source vertex to the terminal vertex of the network graph.

DETAILED DESCRIPTION

Figure 1:
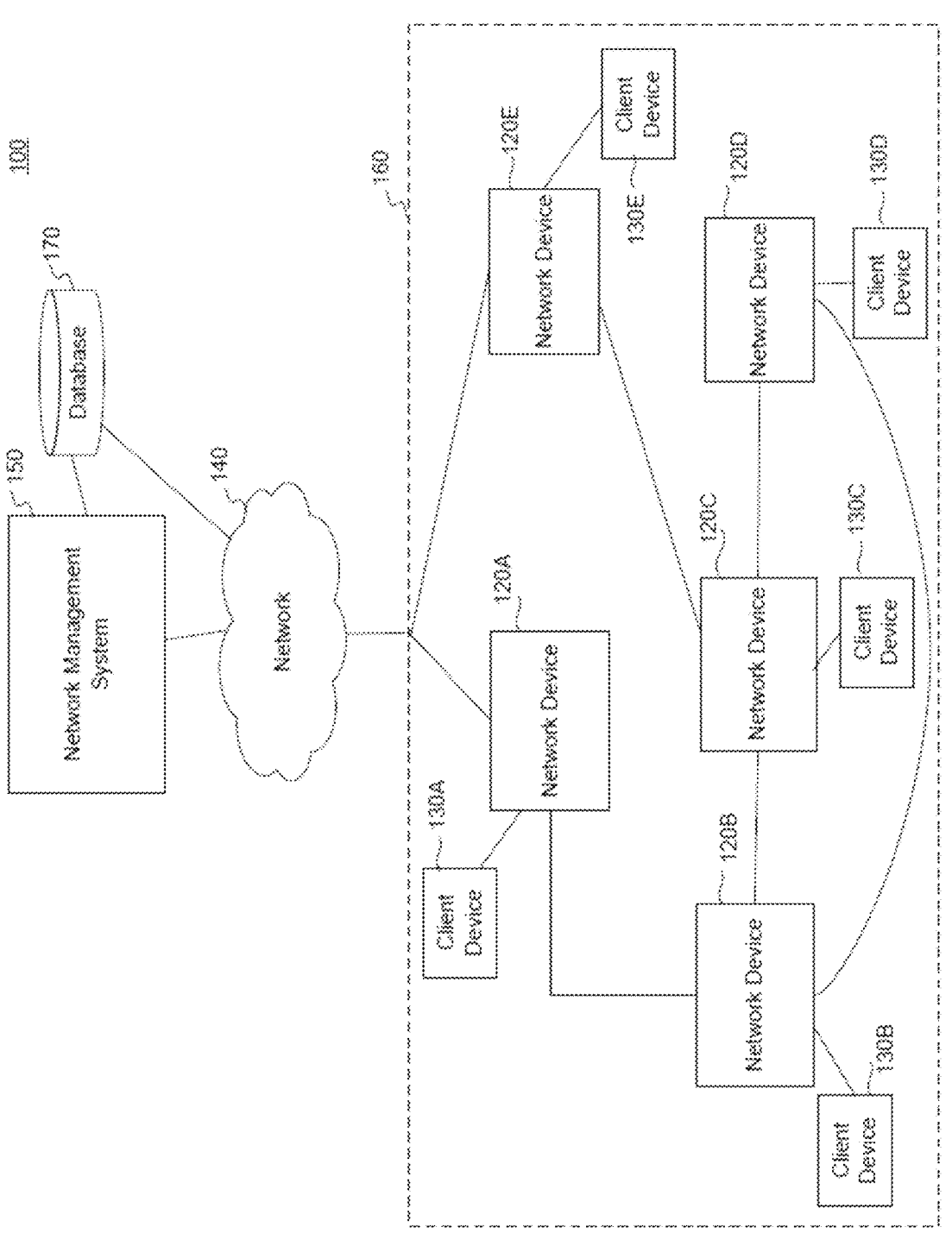
FIG. 1 depicts an exemplary data communication network in which various implementations as described herein may be practiced.

The following detailed description refers to the accompanying drawings. Wherever possible, the same reference numbers are used in the drawings and the following description to refer to the same or similar parts. While several illustrative embodiments are described herein, modifications, adaptations, and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

A communication network can include network nodes (e.g., clients, servers, microservices, virtual machines, serverless code instances, IoT devices, Reconfigurable Optical Add/Drop Multiplexers, switches, routers, etc.) configured to communicate with one another using communication links. The disclosed embodiments are not limited to any particular communication link implementation or physical medium. The communication links can include wired or wireless communication links. Wired communication links can include, for instance, optical links, electrical communication links, or other suitable links. Wireless communication links can include, for example, microwave, radio wave, optical links, or other suitable wireless links. Communications between network nodes can be implemented using communications protocols. The disclosed embodiments are not limited to any particular communication protocol. Communication protocols can include cellular communication protocols (e.g., 3G, 4G, 5G, or the like), IEEE 802 or IEEE 802-based protocols (e.g., Ethernet, WiFi, Zigbee or the like), digital subscriber line (DSL), plain old telephone service (POTS), or other suitable protocols.

A communication network can be configured to satisfy demands. As used herein, a demand can be a request to communicate (or establish a communication channel, or the like) between a source node and a target node in the network. In some embodiments, a demand can specify a source node and a target node. In various embodiments, one or more of the source node and target node can be implicit or determined by the communication network in response to the demand.

The communication network can satisfy the demands using one or more routes provided through the communication network. Each route can be implemented using hardware (e.g., transceivers, or the like) or software resources (e.g., compute, memory, or the like) of the communication network. Consistent with disclosed embodiments, each route can include one or more service links (e.g., light paths between two nodes in an optical network through which light passes unmodified, or the like). The communication network can be configurable to transmit multiple signals along the same communications link. Each signal can have a center frequency and a spectral width (also referred to herein as a frequency slot width). A combination of center frequency and frequency slot width can define a frequency slot. A communication link can be configurable to transmit a signal using any one of a set of frequency slots. Multiple signals can be transmitted using different, non-overlapping frequency slots. In general, wider frequency slots can transmit more information over the same distance (e.g., increased capacity), or the same information over a greater distance. The capacity constraints arising from frequency slot width can be independent of other capacity constraints that may affect a route (e.g., line rates of a transceiver, or the like).

The communication network can be represented by a network graph including network edges corresponding to communication links in the communication network and network vertices corresponding to nodes in the communication network. Consistent with disclosed embodiments, a vertex or an edge can correspond to a sub-network of the communication network. For example, an edge can correspond to three links linearly connected by two nodes. As an additional example, a vertex can correspond to three connected nodes, each of these nodes connected by a link to at least one of the other two nodes. As used herein, the term graph includes semantically equivalent structures, such as adjacency matrices, adjacency lists, adjacency sets, or other semantically equivalent structures.

Pathfinding techniques can identify paths on the network graph that connect vertices corresponding to the source and terminal nodes of demands on the communication network. A network management system (or the like) can then configure the communication network to satisfy the demands by implementing these paths as routes on the communication network.

Existing pathfinding techniques may assume that a path entering a network vertex along a network edge can exit the vertex along any other edge connected to that vertex. This assumption may not hold for real-world communications networks. The devices implementing a node may be configured such that a signal entering the node along a communication link can only exit the node along a subset of the other communication links connected to the node. For example, while a colorless, directionless, contentionless ROADM architecture (CDC ROADM) can enable full connectivity between any communication link and any other communication, other less-capable ROADMs can be limited in terms of which input communication links can connect to which output communication links. As an additional example, a router may provide connections through activated input and output ports. But the capacity of the input ports may collectively exceed the capacity of the output ports. Therefore, the router can potentially operate with only a subset of the input ports active. The router may only be able to transmit data between the output ports and the active input ports. Communication links connected to the inactive input ports may not be able to transmit data to the output ports. Accordingly, a node implemented by the router may lack connectivity between the communication links connected to the inactive input ports and the communication links connected to the output ports. As an additional example, a node on the network graph may be implemented by a collection of internal components. A communications link connected to one of the internal components may have no connectivity to a communication link connected to another one of internal components.

Existing pathfinding techniques may therefore require an additional step of confirming that paths identified on the network path can be implemented as routes on the communication network. This additional step can hinder identification of paths on the communication network.

The disclosed embodiments can use the network graph, a connectivity relation, and a structure lacking zero devisors to determine a path length for which a valid path (e.g., non-looping and consistent with the connectivity relation) exists from a source vertex in the network graph to a terminal vertex in the network graph. In some embodiments, the path length can be determined using a dynamic programming process. Once the path length is determined, a modified version of the dynamic programming process can be used to determine a valid path. The modified process can determine the valid path by progressively extending an initial path. The initial path can begin at the source vertex. Once the initial path extends to the terminal vertex, the valid path has been identified.

The elements of the structure can be assigned to edge pairs (and optionally edges) on the network graph. In some embodiments, the structure can have characteristic two under addition: the addition of two identical nonzero elements of the structure can generate the additive identity element for that structure. Consistent with disclosed embodiments, the dynamic programming process can exploit this property of the structure to identify paths containing loops. The dynamic programming process can map all paths of a predetermined length between two points to an element of the structure. When the element is not the additive identity element, a non-looping path of the predetermined length exists between the two points.

As may be appreciated, the disclosed embodiments enable connectivity-aware determination of paths. The paths may traverse the same node multiple times, but traverse each edge only once. These paths can be used to configure a communication network to satisfy demands on the communication network without requiring a post-solution check of the validity of the path. Accordingly, for at least the foregoing reasons, the disclosed embodiments constitute a technological improvement in network communications management.

FIG. 1 depicts an exemplary communication system 100, consistent with disclosed embodiments. Communication system 100 includes, for example, a network 140, network management system 150, database 170, network devices 120A-120E (collectively nodes 120), and client devices 130A-130E (collectively client devices 130). Nodes 120 and client devices 130 form a communication network 160, in which the nodes 120 provide communication services to client devices 130. The nodes 120 can include hardware-based or software-based switches, routers, splitters, or the like that facilitate delivery of communication services to client devices 130. The components and arrangements shown in FIG. 1 are not intended to limit the disclosed embodiments, as the system components used to implement the disclosed embodiments can vary. For example, each of nodes 120 may be associated with zero or more client devices 130. In various embodiments, communication network 160 can be implemented using on-premises network environments, virtualized (cloud) network environments, or combinations of on-premises and cloud networks. Consistent with embodiments described herein, various types of data may be communicated over communication network 160, such as Internet (e.g., IP protocol) data, telephony or telecommunications data, satellite data, IoT-based data, cellular data, proprietary network data, or other suitable data.

Network management system 150 can be a computer-based system including computer system components, desktop computers, workstations, tablets, handheld computing devices, memory devices, and/or internal network(s) connecting the components. Network management system 150 can be configured to manage communication network 160. For example, the network management system 150 may determine network routes and allocate resources for demands in the communication system 100 (e.g., by determining routing and wavelength assignment for a given set of demands).

Network 140 can facilitate communication between the network management system 150 and the communication network 160. Network management system 150 may send data to nodes 120 via network 140 to allocate resources for demands in communication network 160. Network management system 150 may also receive data from nodes 120 via network 140. This data can indicate the status of communication links in communication network 160.

Network 140 may be an electronic network. Nodes 120 may be configured to receive data over network 140 and process/analyze queries and data. Examples of network 140 include a local area network (LAN), a wireless LAN (e.g., a "WiFi" or mesh network), a Metropolitan Area Network (MAN) that connects multiple LANs, a wide area network (WAN) (e.g., the Internet), a dial-up connection (e.g., using a V.90 protocol or a V.92 protocol), a satellite-based network, a cellular-based network, etc. In the embodiments described herein, the Internet may include any publicly accessible network or networks interconnected via one or more communication protocols, including, but not limited to, hypertext transfer protocol (HTTP/s) and transmission control protocol/internet protocol (TCP/IP). Moreover, the electronic network may also include one or more mobile device networks, such as a 5G network, 4G network, Long-Term Evolution (LTE) network, 3G network, or a Personal Communication Service (PCS) network, that allow mobile devices (e.g., client devices 130) to send and receive data via applicable communication protocols, including those described above.

In the illustrated example, nodes 120A and 120E are directly connected to network 140, and nodes 120B-120D connect to the network 140 via their connection to nodes 120A and/or 120E. Nodes 120B-120D may also directly connect to network 140, or may indirectly connect to the network 140 through numerous other devices. Nodes 120 may be connected to one another via copper wire, coaxial cable, optical fiber, microwave links, or other satellite or radio communication components. Accordingly, nodes 120 may each have a corresponding communication interface (e.g., wireless transceiver, wired transceiver, adapter, etc.) to allow for such communications.

As shown in FIG. 1, nodes 120A-120E are connected to one another. In this example, node 120A is connected to node 120B, node 120B is connected to nodes 120A and 120C, node 120C is connected to node 120B, 120D, and 120E, node 120D is connected to node 120C, and node 120E is connected to node 120C. In some embodiments, the network management system 150 may obtain the connectivity status between the network devices 120 and generate a representation (e.g., a graph) of the connectivity of the network. In various embodiments, the network management system 150 can acquire the network topology from a server or a database associated with a service provider providing the communication network 160. As may be appreciated, communication network 160 illustrated in FIG. 1 is not intended to be limiting. The disclosed embodiments include other service network configurations and topologies.

Network management system 150 can be implemented using one or more computing devices (e.g., a node of node 120, a mobile device, laptop, desktop, workstation, server, computing cluster or cloud computing platform, or the like). Network management system 150 can be implemented as a distributed system over multiple computing devices. The disclosed embodiments are not limited to any particular implementation of network management system 150. In some embodiments, network management system 150 can be implemented over the nodes of communication network 160.

Database 170 can include one or more physical or virtual storages coupled with the network management system 150. Database 170 may be configured to store information associated with the communication network 160, such as a network topology, the capabilities of the nodes 120 or of the communication links connecting them, the demands and corresponding configurations (e.g., routes or the like) provided by the communication network 160, and so on. Database 170 may also be adapted to store processed information associated with the network topology and demands in the communication network 160, to facilitate efficient route configurations and resource allocations (e.g., route configurations and resource allocations that satisfy the demands in the communication network 160). The data stored in database 170 may be transmitted to the network management system 150 and/or the nodes 120. In some embodiments, database 170 can be stored in a cloud-based server (not shown) accessible to the network management system 150 and/or the nodes 120 through the network 140. While the database 170 is illustrated as an external device connected to the network management system 150, the database 170 may also reside within the network management system 150 as an internal component of the network management system 150. In some embodiments, database 170 can be distributed among the nodes of communication network 160.

As shown in FIG. 1, nodes 120 can be connected with client devices 130 respectively to service demands. As an example, client devices 130 may include a display such as a television, tablet, computer monitor, video conferencing console, IoT device, or laptop computer screen. Client devices 130 may also include video/audio input devices such as a video camera, web camera, or the like. As another example, client devices 130 may include mobile devices (e.g., a wearable device, a tablet, a smartphone, a laptop, or other mobile device having display and video/audio capture capabilities). While FIG. 1 shows one client device 130 connected to each node, zero or more client devices 130 may be connected to a node.

In some embodiments, communication network 160 can include an optical network, where the nodes 120 are interconnected by optical fiber links. Such optical fiber links can include optical fiber links that support communication over multiple optical channels using multiple optical wavelengths. The optical network can be implemented, at least in part, using a wavelength division multiplexing (WDM) physical layer. A WDM optical signal can use a plurality of transmission channels, each channel carrying an information signal modulated over a carrier wavelength. A node can be configurable to switch a channel from an input fiber to an output fiber, or to add/drop traffic. A node can include a wavelength switch or an optical add/drop multiplexer that performs optical add, drop, and pass-through. A node may include optical or optical/electrical elements configurable to perform functions including compensating, amplifying, switching, restoring, performing wavelength conversion of incoming optical signals, etc. The optical fiber links may include dispersion compensation fibers (DCF), optical filters, amplifiers, and other relevant optical components suitable for operation of optical networks. The network management system 150 or database 170 can store topologic data that includes information about optical channels and their associated wavelengths. The WDM physical layer can be configured to support flexible assignment of frequencies and wavelengths to signals. For example, a communication link can carry a first signal and a second signal. The first signal can have a first spectral width (also referred to herein as a frequency slot width) and a first central frequency, while the second signal has a second spectral width and a second central frequency. The first and second signals can be non-overlapping in the frequency spectrum. In some embodiments, the WDM physical layer can be or support an elastic optical network (e.g., a "Flexgrid" network or the like).

Figure 2:
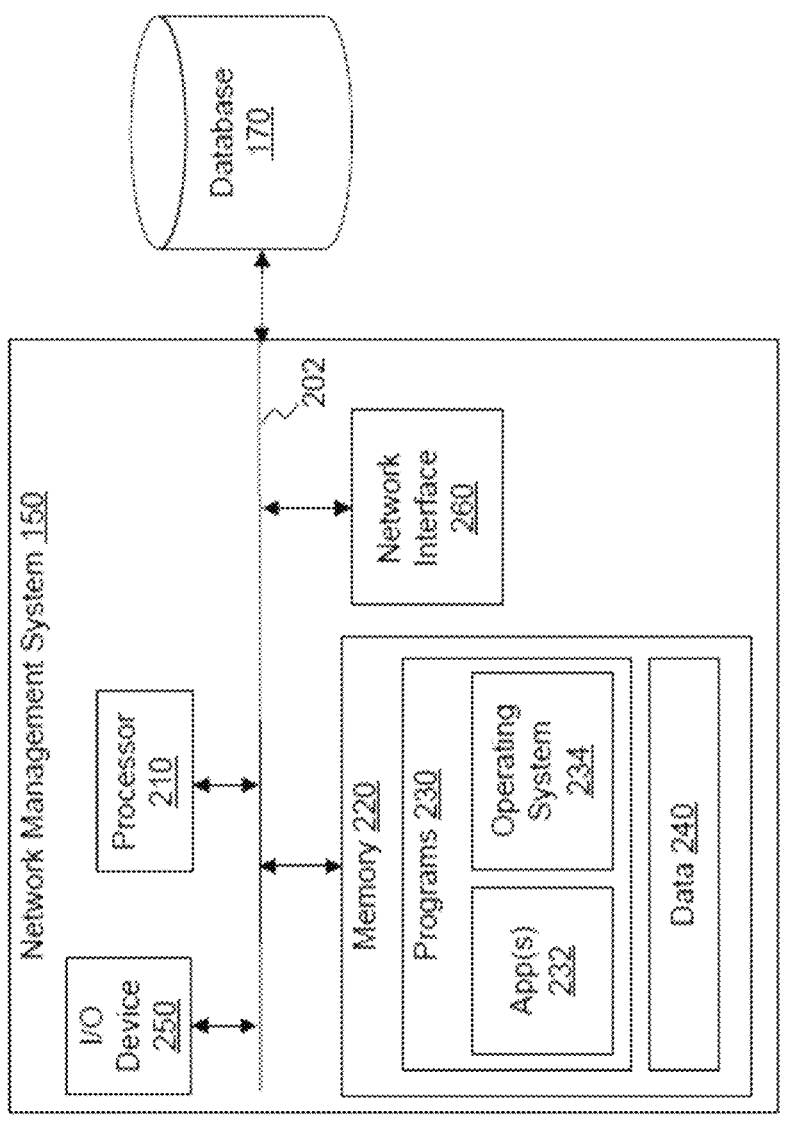
FIG. 2 depicts a diagram of an exemplary computing device suitable for implementing a network management system, consistent with disclosed embodiments.

FIG. 2 depicts a diagram of an exemplary computing device 201 (e.g., a mobile device, laptop, desktop, workstation, network appliance, or the like) suitable for implementing network management system 150, consistent with the disclosed embodiments. Network management system 150 can be implemented using one or more such computing devices 201 (e.g., a single computing device, a cluster of such computing devices, a virtual computing device running on such a computing device, a cloud-computing platform implemented using such devices, or another suitable implementation). Network management system 150 can be configured, by configuring the computing device(s) implementing network management system 150, to perform systems and methods for managing a communication network, consistent with disclosed embodiments. In such a manner, network management system 150 can be configured to determine paths for demands over a network graph. In some embodiments, network management system 150 can configure a communication network corresponding to the network graph (e.g., communication network 160, or the like) to satisfy the demands using routes corresponding to the paths.

Consistent with disclosed embodiments, computing device 201 can also be suitable for implementing a node, such as one or more of nodes 120. The one or more of nodes 120 can be configured, by configuring the computing device(s) implementing the one or more of nodes 120, to perform systems and methods for configuring the communication network to satisfy one or more demands using routes corresponding to determined paths on a network graph corresponding to the communication network.

The computing device 201 can include a bus 202 (or other communication mechanism) which interconnects subsystems and components for transferring information within computing device 201. As shown, the computing device 201 can include one or more processors 210, input/output ("I/O") devices 250, network interface 260 (e.g., a modem, Ethernet card, or any other interface configured to exchange data with a network), and one or more memories 220 storing programs 230 including, for example, server app(s) 232, operating system 234, and data 240, and can communicate with a database 170. In some embodiments, database 170 can be an external database (e.g., separate from computing device 201). In some embodiments, database 170 can be an internal database (e.g., included within computing device 201).

The processor 210 can be a central processing unit (CPU), graphical processing unit (GPU), application specific integrated circuit (ASIC) of system on a chip (SoC), field programmable gate array (FPGA), or the like. The processor 210 may comprise a single core or multiple core processors executing parallel processes simultaneously. For example, the processor 210 may be a single-core processor configured with virtual processing technologies. In certain embodiments, processor 210 may use logical processors to simultaneously execute and control multiple processes. The processor 210 may implement virtual machine technologies, or other technologies to provide the ability to execute, control, run, manipulate, store, etc. multiple software processes, applications, programs, etc. In some embodiments, the processor 210 may include a multiple-core processor arrangement (e.g., dual, quad core, etc.) configured to provide parallel processing functionalities to allow the computing device 201 to execute multiple processes simultaneously. It is appreciated that other types of processor arrangements could be implemented that provide for the capabilities disclosed herein.

The memory 220 may be a volatile or non-volatile, magnetic, semiconductor, tape, optical, removable, non-removable, or other type of storage device or tangible or non-transitory computer-readable medium that stores one or more program(s) 230 such as server apps 232 and operating system 234, and data 240. Possible forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, or any other flash memory, NVRAM, a cache, a register, any other memory chip or cartridge, and networked versions of the same.

Computing device 201 may include one or more storage devices configured to store information used by processor 210 (or other components) to perform certain functions related to the disclosed embodiments. For example, computing device 201 may include memory 220 that includes instructions to enable the processor 210 to execute one or more applications, such as server apps 232, operating system 234, and any other type of application or software known to be available on computer systems. Alternatively or additionally, the instructions, application programs, etc. may be stored in an external database 170 (which can also be internal to computing device 201) or external storage communicatively coupled with computing device 201 (not shown), such as one or more database or memory accessible over the network 140.

Database 170 or other external storage may be a volatile or non-volatile, magnetic, semiconductor, tape, optical, removable, non-removable, or other type of storage device or tangible or non-transitory computer-readable medium. Memory 220 and database 170 may include one or more memory devices that store data and instructions used to perform one or more features of the disclosed embodiments. The memory 220 and database 170 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases.

In some embodiments, computing device 201 may be communicatively connected to one or more remote memory devices (e.g., remote databases or the like) through network 140 or a different network. The remote memory devices can be configured to store information that the computing device 201 can access and/or manage. By way of example, the remote memory devices could be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Programs 230 may include one or more software modules configured to cause processor 210 to perform one or more functions of the disclosed embodiments. Moreover, processor 210 may execute one or more programs located remotely from one or more components of communication system 100. For example, computing device 201 may access one or more remote programs that, when executed, perform functions consistent with disclosed embodiments.

Consistent with disclosed embodiments, server app(s) 232 can cause processor 210 to perform functions consistent with disclosed embodiments. For example, server app(s) 232 can cause processor 210 to determine routes and allocate resources for services to be delivered in communication network 160.

In some embodiments, program(s) 230 may include operating system 234 performing operating system functions when executed by one or more processors such as processor 210. By way of example, operating system 234 may include Microsoft Windows™, Unix™, Linux™ Apple™ operating systems, Personal Digital Assistant (PDA) type operating systems, such as Apple iOS™, Google Android™, Blackberry OS™, or other types of operating systems. Accordingly, disclosed embodiments may operate and function with computer systems running any type of operating system 234. Computing device 201 may also include software that, when executed by processor 210, enables communication with network 140 through the network interface 260 and/or a direct connection to one or more nodes 120A-120E.

In some embodiments, data 240 may include, for example, network configurations, requirements of demands, routes for satisfying the demands (e.g., exclusive routes, backup routes, or the like) and relationships between the routes (e.g., mappings between backup routes and communication link failures), capacities of the network devices, and so on. For example, data 240 may include a network topology of the communication network 160 and operating statuses (e.g., operating properly or not operating properly) of the communication links between the nodes 120. The data 240 may also specify demand requirements and routes for each demand in the communication network 160.

Computing device 201 may also include one or more I/O devices 250 having one or more interfaces for receiving signals or input from devices and providing signals or output to one or more devices that allow data to be received and/or transmitted by network management system 150. For example, computing device 201 may include interface components for interfacing with one or more input devices (e.g., keyboard(s), mouse device(s), and the like) that enable computing device 201 to receive input from an operator or administrator (not shown).

Figure 3:
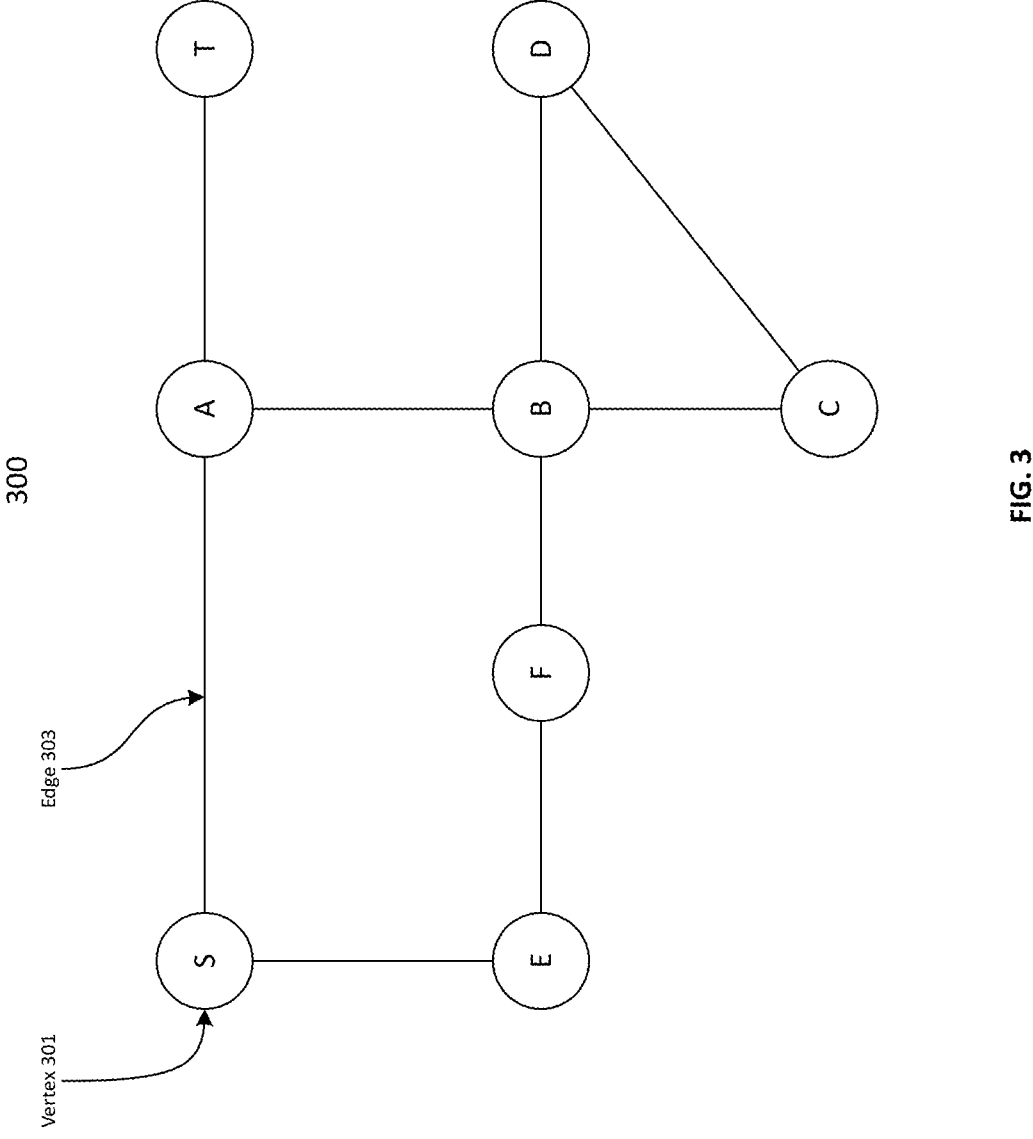
FIG. 3 depicts an exemplary network graph, consistent with disclosed embodiments.

FIG. 3 depicts an exemplary network graph 300, consistent with disclosed embodiments. Network graph 300 includes vertices (e.g., vertex 301) and edges (e.g., edge 303). As described herein, a vertex can correspond to a node of a communication network (or a sub-network of the communication network). Similarly, an edge can correspond to a communication link of a communication network (or a sub-network of the communication network). In this simple example, the network graph includes eight vertices connected by nine edges. A demand is associated with the network graph. The demand specifies a source vertex S and a terminal vertex T. Consistent with disclosed embodiments, a network management system (e.g., network management system 150, or the like) can be configured to determine a path on communication network 300 that connects vertex S and vertex T.

Figure 4:
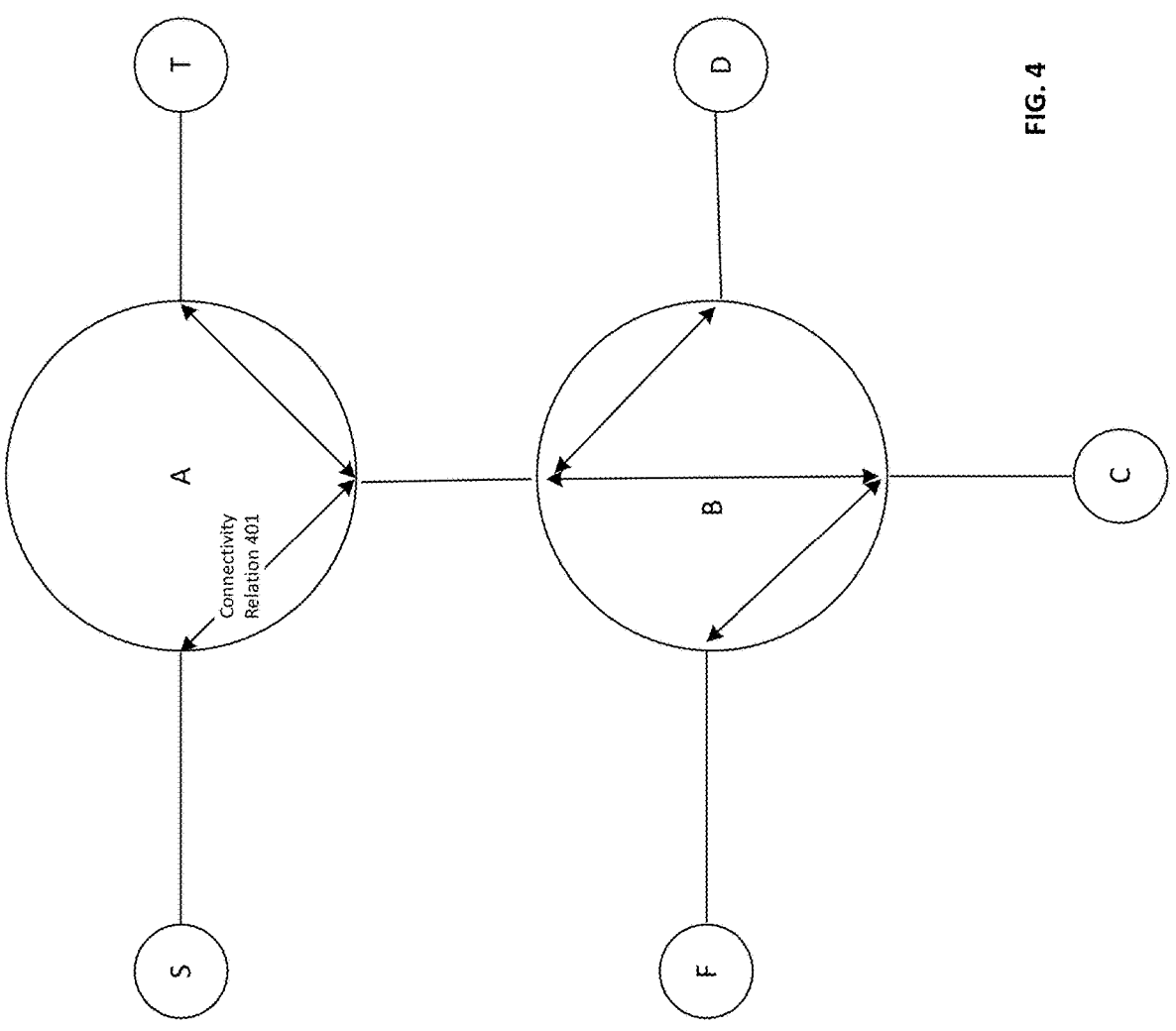
FIG. 4 depicts details of the exemplary network graph of FIG. 3, schematically depicting a connective relation among edges, consistent with disclosed embodiments.

FIG. 4 depicts exemplary details of network graph 300 of FIG. 3, schematically depicting connectivity relationships for certain vertices of network graph 300, consistent with disclosed embodiments. In this example, vertices S, T, E, F, C, and D are fully connected: any edge connected to one of vertices S, T, E, F, C, and D is connected to any other edge connected to that one of vertices S, T, E, F, C, and D. For example, edge $e_{ef}$ is connected to edge $e_{fg}$ and edge $e_{bd}$ is connected to edge $e_{cd}$.

However, the connectivity relationships for vertices A and B are more complicated. These relationships are depicted as connections within vertices A and B (e.g., connectivity relation 401). In this example, vertex A is connected to vertex S through edge $e_{sa}$, to vertex B through edge $e_{ab}$, and to vertex T through edge $e_{at}$. However, edge $e_{sa}$ connects to edge $e_{ab}$, but not to edge $e_{at}$. The path $\{S, A, B\}$ is therefore a valid path on the network graph, but the path $\{S, A, T\}$ is not. Similarly, vertex B is connected to vertex F through edge $e_{fb}$, to vertex C through edge $e_{bc}$, to vertex A through edge $e_{ab}$, and to vertex D through edge $e_{bd}$. However, edge $e_{fa}$ connects to edge $e_{be}$, but not to edge $e_{ab}$ or to edge $e_{bd}$. The $\{F, B, C\}$ is therefore a valid path on the network graph, but the path $\{F, B, A\}$ is not.

In some embodiments, a connectivity set can be associated with a network graph. The connectivity set can specify valid pairs of edges. For example, the pair $\{e_{sa}, e_{ab}\}$ can be a valid pair of edges (e.g., due to connectivity relation 401), while the pair $\{e_{sa}, e_{at}\}$ may not be a valid pair of edges. For convenience of discussion, the connectivity set is described as expressly containing valid pairs of consecutive edges (and, in some embodiments, a source edge and a terminal edge, as described herein). However, the disclosed embodiments are not so limited. In some embodiments, the connectivity set can associate an indicator with each pair of different edges contained in the network (e.g., the connectivity set can include the values $\{\{e_{sa}, e_{ab}\}, \text{TRUE}\}$ and $\{\{e_{sa}, e_{fb}\}, \text{FALSE}\}$), each pair of different edges contained in the network that share an endpoint, or the like. Consistent with disclosed embodiments, when $\{e_{xy}, e_{yz}\}$ is a valid pair, $\{e_{yz}, e_{xy}\}$ is also a valid pair. In some embodiments, the connectivity set can include a single entry for each valid pair of edges.

In some embodiments, the connectivity set can be implicit. For example, a connectivity relation can be specified on the network graph. The connectivity relation can map from pairs of edges on the graph (and, in some embodiments, edges of the graph, as described herein) to a validity indication (e.g., true/false, I/O, valid/invalid, or any other suitable indicator). The pairs of edges can be pairs of consecutive edges. As used herein, a connectivity set can include the image of such a connectivity relation on the set of edge pairs of the network graph. In such embodiments, obtaining the connectivity set can include obtaining the connectivity relation that defines the connectivity set. The connectivity relation can be symmetric, such that when the connectivity relation maps $\{e_{xy}, e_{yz}\}$ to an indicator of validity (or invalidity), the connectivity relation also maps $\{e_{yz}, e_{xy}\}$ to an indicator of validity (or invalidity).

FIG. 5 depicts an exemplary process 500 for configuring a communications network, consistent with disclosed embodiments. For convenience of description, process 500 is described herein as being performed by a network management system (e.g., network management system 150, or the like). However, the disclosed embodiments are not so limited. In some embodiments, process 500 can be performed by another component of the communications network (e.g., one or more of nodes 120, or the like), or another system. For convenience of description, the dynamic programming processes performed in steps 530 and 540 are described as proceeding from the source to the terminal vertex. However, the disclosed embodiments are not so limited. In some embodiments, one or more of these dynamic programming processes can proceed from the terminal to the source vertex.

Exemplary process 500 can be performed as a one-time activity. For example, exemplary process 500 can be performed upon initialization of a network node, sub-network, or communication network. Exemplary process 500 can be performed according to a schedule (e.g., hourly, daily, multiple times per day or week, monthly, or the like) or in response to an event. The event can concern the demands on the communication network, the status of the communication network, receipt of an instruction or command, or the like. A change in the demands on the communication network can include a change in the set of demands on the communication network (e.g., addition or removal of a demand) or in characteristics of one or more of the demands (e.g., change in volume, OSNR requirements, or the like). A change in the status of the communication network can include the addition or removal of a node, a communication link connecting two nodes, or a combination of a communication link and a frequency slot (or transceiver, or portion of a frequency spectrum). For example, addition of a new node connected to the rest of the communication network through one or more communication links can trigger performance of process 500. Similarly, the failure of a transceiver on a communication link, resulting in the inability to use frequency slots corresponding to that transceiver on that communication link, can trigger performance of process 500. An instruction or command can expressly or implicitly request performance of process 500 (e.g., from a user of the communication network, an administrator of the communication network, or the like), or the like.

In step 510 of process 500, the network management system can obtain a network graph, a demand on the network, a connectivity set for the network, and a structure.

Obtaining the network graph, demand, connectivity set, or structure can include receiving or retrieving at least one of the network graph, demand, connectivity set, or structure from another component of the communication system (e.g., one or more of nodes 120, database 170, or the like), from another system, from a memory accessible to the network management system, or the like. For example, the network management system can receive or retrieve the network graph, demand, connectivity set, or structure from a database (e.g., database 170, or the like) or a computing device of a user or administrator of the communication system. As an additional example, the network management system can receive or retrieve the demand from a client device connected to a node.

Obtaining the network graph, demand, connectivity set, or structure can include obtaining information useable to generate at least one of the network graph, demand, connectivity set, or structure from another component of the communication system (e.g., one or more of nodes 120, database 170, or the like), from another system, from a memory accessible to the network management system, or the like. The network management system can then create (or update) the network graph, demand, connectivity set, or structure using the obtained information. For example, the network management system can obtain information specifying the connectivity of the individual nodes of the communication network (e.g., from the nodes, a database of the communication system, or another system). The network management system can create or update the network graph or connectivity set using this information. The network management system can then generate a suitable structure (e.g., based on the size of the connectivity set and a desired false negative rate, as described herein). As an additional example, the network management system can receive or retrieve a connectivity relation from the database or another system. The network management system can then generate the connectivity set using the network graph and the connectivity relation.

Consistent with disclosed embodiments, the network graph can represent a communication network. The network graph can include vertices corresponding to nodes in the communication network. In some embodiments, a node in the network graph can be a sub-network on the communication network. The network graph can include edges corresponding to communication links in the communication network. In some embodiments, an edge in the network graph can be a sub-network on the communication network.

Consistent with disclosed embodiments, the demand can specify a source node and a terminal node on the communication network.

Consistent with disclosed embodiments, the connectivity set can specify the valid pairs of edges on the network graph. As described herein, the connectivity set can expressly include each valid pair of edges for the network graph, expressly include all pairs of edges in the network graph (or all pairs of edges sharing an endpoint vertex), or be the image of a connectivity relation defined on the pairs of edges on the network graph. In some embodiments, the connectivity set can further include all edges in the network graph, or all edges connected to the source vertex or to the terminal vertex.

Consistent with disclosed embodiments, the structure can lack zero divisors and can include both an additive identity element and other, additional elements. For example, there exists a Y in the structure such that for all X in the structure, Y+X=X. In some embodiments, the structure can be a field. In some embodiments, the structure can have characteristic two under addition: addition of two identical elements of the structure can generate the additive identity element for that structure. For example, for all X in the structure, X+X=Y (the additive identity element). In some embodiments, the structure can be a field.

In some embodiments, the structure can be a set of polynomials. In some embodiments, the set of polynomials can be a modulus field constructed using the binary field $Z_2$. For example, given a set of polynomials $Z_2[x]$ that includes the polynomials of the type $$\sum_{k=0}^{n} a_k \cdot x^k,$$

where $\forall k: a_k \in Z_2$, the set of polynomials can be $$F_q := \frac{z_2[x]}{q(x)},$$

where $q(x) \in Z_2[x]$ is an irreducible polynomial of order m. The field $F_q$ can be constructed with addition and multiplication done modulo $q(x)$. For example, when $q(x)$ is $x^3+x+1$, $F_q=\{[0], [1], [x], [1+x], [x^2], [x^2+1], [x^2+x], [x^2+x+1]\}$. In this example, $[x^2+x]+[x^2+x]=0$ and $[x^2+x][x^2+x]=x^4+x^3+x^2=x^4+x^2=(x^3+x+1)\cdot x+x=q(x)\cdot x+x=x$ due the polynomial coefficients being in the binary field $Z_2$ and the multiplication being modulo $q(x)$.

In step 520 of process 500, the network management system can assign elements in the structure to elements of the connectivity set. In some embodiments, each element of the connectivity set can be assigned a non-zero element of the structure. In some embodiments in which the connectivity set includes both valid and invalid elements, each valid element of the connectivity set can be assigned a non-zero element of the structure, while each invalid element of the connectivity set can be assigned the zero element of the structure. In some embodiments, the non-zero elements can be different. For example, the assignment can be random without replacement.

Consistent with disclosed embodiments, the network management system can determine an element of the structure associated with the set of paths starting at the source vertex, ending at the terminal vertex, and having a certain path length. As described herein, the value of such a path-length element can indicate whether the set of paths includes a valid path. When the path-length element is not the additive identity element of the structure, the set of paths includes a valid path. When the path-length element is the additive identity element, the set of paths may include a valid path with a bounded probability.

Consistent with disclosed embodiments, a path-length element can be associated with a combination of path length, network graph, connectivity set, structure, and initial and final vertices (e.g., the source and terminal vertices of a demand). The path-length element can be an element of the structure (or a null element). For example, $T_l(s, t) \in F_q$ can be the path-length element for the set of paths between vertex s and vertex t of length l.

Consistent with disclosed embodiments, determining a path-length element can involve determining an edge-specific element. An edge-specific element can be associated with a particular combination of path length, network graph, connectivity set, structure, initial and final vertices, and edge connecting to the final vertex. The edge-specific element can be an element of the structure (or a null element). In some embodiments, $W_l(s, e, t)$ can be the set of paths between vertex s and vertex t of length l that end with edge l. Then $f(W_l(s, e, t)) \in F_q$ can be the edge-specific element corresponding to $W_l(s, e, t)$. In some embodiments, given a set of edges $N(t)$ that connect to vertex t:

$$T_l(s, t) = \sum_{N(t)} f(W_l(s, e, t))$$

The path-length element can be the sum of the edge-specific elements under modulo $q(x)$ addition for the edges that connect to vertex t.

Consistent with disclosed embodiments, determining an edge-specific element can include determining a path element. A path element can be associated with a particular combination of path length, network graph, connectivity set, structure, and path connecting the initial and final vertices. The path element can be an element of the structure. For example, $f(p) \in F_q$ can be the path element for the path p. In some embodiments, given a set X of paths that connect vertex s to vertex t, have length l, and have the final edge e:

$$f(W_l(s, e, t)) = \sum_{w \in X} f(w)$$

The edge-specific elements for edge e can be the sum of the path elements under modulo q(x) addition for the paths that connect vertex s to vertex t, have length l, and have the final edge e.

Consistent with disclosed embodiments, the path elements can be the product of the elements of the structure associated with each pair of edges in the path (and optionally the first edge) under modulo q(x) multiplication. For example, when p is the ordered sequence of k edges p= $e_1, e_2, \ldots, e_k$, then $f(p)=f(e_1) \cdot f(e_1, e_2) \cdot \ldots \cdot f(e_{k-1}, e_k)$.

FIG. 6 depicts a recursive determination of a path-element, consistent with disclosed embodiments. In this example, the demand has vertex S as the source vertex and vertex T as the terminal vertex. The path-length element $T_3(s, t)$ corresponds to all paths of length 3 that connect vertex s and vertex t. The path-length element $T_3(s, t)$ can be decomposed into the sum of two edge-specific elements, each corresponding to one of the two edges connected to vertex T:

$$T_3(s, t) = f(W_3(s, e_{bt}, t)) + f(W_3(a, e_{dt}, t))$$

In this decomposition, $W_3(s, e_{bt}, t)$ is the set of paths that start at vertex s, end at vertex t, and have edge $e_{bt}$ as the final edge in the path. Likewise, $W_3(a, e_{dt}, t)$ is the set of paths that start at vertex s, end at vertex t, and have edge $e_{bt}$ as the final edge in the path.

In turn, $f(W_3(s, e_{bt}, t))$ can be decomposed into the sum of two products. Each product can correspond to one of the edges connected to vertex b:

$$f(W_3(s, e_{bt}, t)) = f(W_2(s, e_{ab}, b)) \cdot f(e_{ab}, e_{bt}) + f(W_2(s, e_{cb}, b)) \cdot f(e_{cb}, e_{bt})$$

Similarly, $f(W_3(s, e_{dt}, t))$ can be decomposed into the sum of two products. Each product can correspond to one of the edges connected to vertex d:

$$f(W_3(s, e_{dt}, t)) = f(W_2(s, e_{ad}, d)) \cdot f(e_{ad}, e_{dt}) + f(W_2(s, e_{cd}, d)) \cdot f(e_{cd}, e_{dt})$$

In turn, $f(W_2(s, e_{ab}, b))$, $f(W_2(s, e_{cb}, b))$, $f(W_2(s, e_{ad}, d))$, and $f(W_2(s, e_{cd}, d))$ can be decomposed as follows:

$$f(W_2(s, e_{ab}, b)) = f(W_1(s, e_{sa}, a)) \cdot f(e_{sa}, e_{ab})$$

$$f(W_2(s, e_{cb}, b) = f(W_1(s, e_{sc}, c)) \cdot f(e_{sc}, e_{cb})$$

$$f(W_2(s, e_{ad}, d)) = f(W_1(s, e_{sa}, a)) \cdot f(e_{sa}, e_{ad})$$

$$f(W_2(s, e_{cd}, d)) = f(W_1(s, e_{sc}, c)) \cdot f(e_{sc}, e_{cd})$$

In this example, $f(W_1(s, e_{sa}, a))=f(e_{sa})$, as only a single edge $e_{sa}$ is included in the set $W_1(s, e_{sa}, a)$. Likewise, $f(W_1(s, e_{sc}, c))=f(e_{sc})$. Overall, $T_3(s, t)$ can be decomposed as:

$$T_3(s, t) = f(e_{sa}) \cdot f(e_{sa}, e_{ab}) \cdot f(e_{ab}, e_{bt}) + f(e_{sc}) \cdot f(e_{sc}, e_{cb}) \cdot f(e_{cb}, e_{bt}) +$$
$$f(e_{sa}) \cdot f(e_{sa}, e_{ad}) \cdot f(e_{ad}, e_{dt}) + f(e_{sc}) \cdot f(e_{sc}, e_{cd}) \cdot f(e_{cd}, e_{dt})$$

While the recursive decomposition depicted in FIG. 6 may be useful in explaining how a path-length element can be constructed from individual elements mapped to the edges and edge pairs in the connectivity set, the disclosed embodiments are not limited to such a recursive decomposition. Instead, as described herein, the disclosed embodiments may generate path-length elements using a dynamic programming process.

Consistent with disclosed embodiments, for any path p that enters and exits a loop through a repetitive edge, there exists a counterpart path p of the same length that also enters and exits the loop through the repetitive edge. The two paths will both contribute equally to the path-length element. Accordingly, because $F_q$ has characteristic two, this contribution will be zero.

More generally, given a set $W_l(s, e_{yt}, t)$ for some $e_{yt} \in N(t)$ that is either empty or a collection of illegal R-paths from s to t. If the set is empty, then $f(W_l(s, e_{yt}, t))=f(\phi)=0$. Otherwise, let $w \in W_l(s, e_{yt}, t)$ be an arbitrary illegal R-path. Now, $w=e_1, e_2, \ldots e_k$. Since w is an illegal R-path, there exists an edge which appear more than once. Denote i as the first index where such edge exists, and j as the last occurrence of this same edge. Denote $w[i_1, i_2]$ as the sub-path of w which starts at index $i_1$ and ends at index $i_2$ included. Define $w':=w[1, i-1] \circ Reverse(w[i,j]) \circ w[j+1, k]$. w' is also an illegal R-path, since $(e_{i-1}, e_j)=(e_{i-1}, e_i) \in R$ and $(e_i, e_{j+1})=(e_j, e_{j+1}) \in R$. Hence, $w' \in W_l(s, e_{yt}, t)$.

Because modulo multiplication is commutative, $f(e_{xy}, e_{yz})$ equals $f(e_{zy}, e_{yx})$ for all x, y, and z. Because $F_q$ has characteristic two, $f(w')+f(w)=0$. Accordingly, every illegal path $w \in W_l(s, e_{yt}, t)$ has a counterpart $w' \in W_l(s, e_{yt}, t)$, such that $f(w')+f(w)=0$.

Figure 7A:
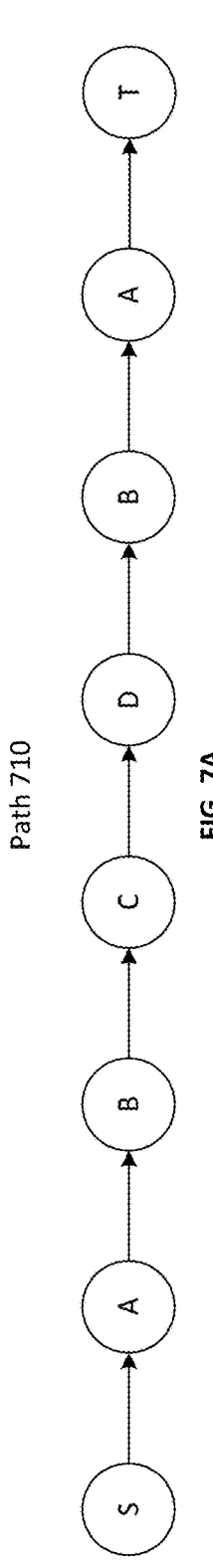
FIGS. 7A to 7C depict paths on the exemplary network graph of FIGS. 3 and 4, consistent with disclosed embodiments.
Figure 7B:
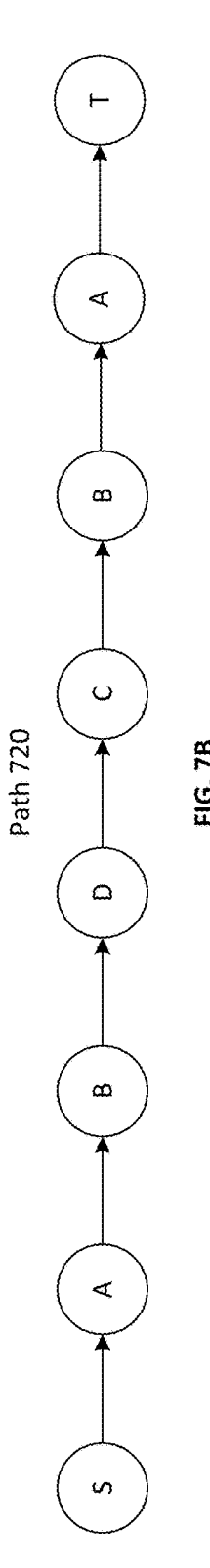

For example, FIGS. 7A and 7B depict two paths on the exemplary network graph of FIGS. 3 and 4, consistent with disclosed embodiments. The two paths are depicted as sequences of vertices connected by edges. Each of the two paths connects the source vertex s with the terminal vertex t and satisfy the connectivity relationship depicted in FIG. 4. Paths 710 and 720 both enter the loop B, C, D through the repetitive edge $e_{ab}$. Path 710 proceeds counterclockwise around the loop, while path 720 proceeds clockwise through the loop.

Consistent with disclosed embodiments, path 710 can be associated with an element of $F_q$: $f(p_{710})=f(e_{sa}) \cdot f(e_{sa}, e_{ab}) \cdot f(e_{ab}, e_{bc}) \cdot f(e_{bc}, e_{cd}) \cdot f(e_{cd}, e_{db}) \cdot f(e_{db}, e_{ba}) \cdot f(e_{ba}, e_{at})$. Similarly, path 620 can also be associated with an element of $F_q$: $f(p_{720})=f(e_{sa}) \cdot f(e_{sa}, e_{ab}) \cdot f(e_{ab}, e_{bd}) \cdot f(e_{bd}, e_{dc}) \cdot f(e_{dc}, e_{cb}) \cdot f(e_{cb}, e_{ba}) \cdot f(e_{ba}, e_{at})$. Because modulo multiplication is commutative and $f(e_{xy}, e_{yz})$ equals $f(e_{zy}, e_{yx})$ for all x, y, and z, $f(p_{710})=f(p_{720})$. Accordingly, in this example, $T_7(s, t)=W_7(s, e_{at}, t)=f(p_{710})+f(p_{720})$. Because $F_q$ has characteristic two, $T_7(s, t)=W_7(s, e_{at}, t)=0$.

Figure 7C:
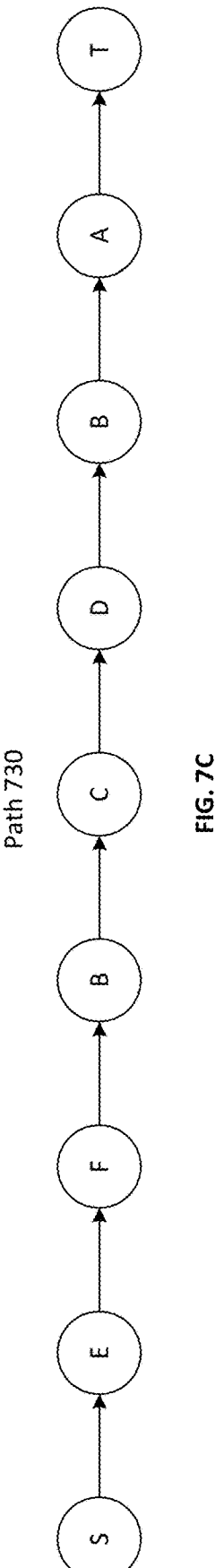

In contrast, FIG. 7C depicts a path 630 that does not include a repetitive edge. Path 630 therefore lacks a counterpart path including the same edge pairs. Path 630 can be associated with an element of $F_q$: $f(p_{630})=f(e_{se}) \cdot f(e_{se}, e_{ef}) \cdot f$ $(e_{ef}, e_{fb}) \cdot (e_{bc}, e_{cd}) \cdot f(e_{cd}, e_{db}) \cdot f(e_{db}, e_{ba}) \cdot f(e_{ba}, e_{at})$. In this example, $T_8(s, t) = W_8(s, e_{at}, t) = f(p_{630})$.

As may be appreciated, the product $f(e_{se}) \cdot f(e_{se}, e_{ef}) \cdot f(e_{ef}, e_{fb}) \cdot f(e_{bc}, e_{cd}) \cdot f(e_{cd}, e_{db}) \cdot f(e_{db}, e_{ba}) \cdot f(e_{ba}, e_{at})$ will typically evaluate to an element of F that differs from the additive identity element. However, in some instances, $f(p_{630})$ may evaluate to the additive identity element. Thus, while $T_l(s, t) \neq 0$ indicates that a valid path of length 1 exists, $T_1(s, t) = 0$ does not indicate that no valid path of length 1 exists.

The DeMillo-Lipton-Schwartz-Zippel lemma can bound the probability that $f(p_{630})$ evaluates to the additive identity element. Let $F_q$ be a field of size q. Let $p \in F_q [x_1, \ldots, x_t]$ be a nonzero polynomial of total degree at most d. Then, for $r_1, r_2, \ldots, r_t \in F_q$ selected independently and uniformly at random, $$Pr[p(r_1, r_2, \ldots, r_t) \neq 0] \geq 1 - \frac{d}{q}$$

or, $$Pr[p(r_1, r_2, \ldots, r_t) = 0] \leq \frac{d}{q}$$

The probability that the polynomial evaluates to the additive identity element, given the terms of the polynomial correspond to randomly selected elements of the structure, is smaller than d/q. When the structure comprises $$F_q := \frac{Z_2[x]}{q(x)},$$

where $q(x) \in Z_2 [x]$ is an irreducible polynomial of order m, the size of the field and the total degree of p depend on the degree of q(x). The greater the degree of q(x), the smaller the value of d/q. However, the greater the degree of q(x), the more resources required to generate $F_q$. In some embodiments, the degree of q(x) can be chosen to provide a desired false negative probability. For example, given a predetermined false negative probability criterion (e.g., a 5% false negative chance, a 1% false negative chance, or another suitable probability) the network management system can select the degree of q(x) such that d/q is less than or equal to the desired false negative probability. In some embodiments, in response to a path-length element being the additivity identity element, the network management system can reassign elements of $F_q$ to the connectivity set and repeat the determination of the additivity identity element.

In step 530 of process 500, the network management system can identify a path length for which a valid path exists for the demand obtained in step 510, consistent with disclosed embodiments. The valid path can connect source and terminal vertices specified by the demand. Consistent with disclosed embodiments, a path-length element can be determined for a path length using dynamic programming. In a first iteration, path-length elements can be determined for each vertex connected to the source vertex by an edge (e.g., having a path length of 1). In a second iteration, if none of the neighboring vertices considered in the first iteration is the terminal vertex, path-length elements can be determined for each vertex connected to each of the neighboring vertices by an edge (e.g., having a path length of 2). The path-length elements in the second iteration can be determined using the path-length elements determination determined in the first iteration. This iterative process can continue, progressively increasing the path length, until a termination condition is satisfied.

In some embodiments, the termination condition can be satisfied when the last vertex is the terminal vertex and the path-length element is not the additive identity element. Process 500 can then proceed to step 540.

In some embodiments, the termination condition can be satisfied when the last vertex is the terminal vertex and the path-length element is the additive identity element. The network management system can return to step 520 and reassign elements of the structure to the connectivity set. The network management system may then return to step 530 and again attempt to identify a path length for which the path-length element is not the additive identity element. In this manner, the network management system can address the possibility that the path-length element incidentally evaluated to the additive identity element.

In some embodiments, the termination condition can be satisfied when the path length exceeds a path-length threshold or when a duration of process 500 (or step 530) exceeds a duration threshold. In some embodiments, the path-length threshold or the duration threshold can depend on the demand and the network graph. For example, the path-length threshold can be some multiple (e.g., a multiple between 1 and 10, or the like) of a naïve path length (e.g., a path length that does not consider connectivity) between the source and terminal vertices. As an additional example, the path-length threshold can be some multiple (e.g., a multiple between 0.5 and 2, or the like) of the number of edges in the network graph. In some embodiments, the path-length threshold or the duration threshold can be predetermined. For example, the path-length or duration threshold can have a default value or can be received from a user of the communication system (e.g., an administrator). Process 500 can then terminate, and the network management system may provide a termination indication (e.g., an error, a warning message, a diagnostic message, or another suitable indication) to a user of the communication system (e.g., an administrator, or the like), to another component of the communication system (e.g., one of nodes 120, or database 170, or the like), or to another system.

In step 540 of process 500, the network management system can determine a valid path the connects the source and terminal vertices, consistent with disclosed embodiments. The network management system can determine the valid path iteratively. In a first iteration, the network management system can select an edge connected to the source vertex. The network management system can determine whether the dynamic programming process of step 530 returns the same path length as identified in step 530, when the initial path is limited to the selected edge. If not, another edge can be selected, and the process repeated. If so, the initial path can be extended by selecting another edge connected to the first edge. The network management system can then determine whether the dynamic programming process of step 530 returns the same path length as identified in step 530, when the initial path is limited to the first two selected edges. This process can be repeated until the initial path extends to the terminal vertex.

In step 550 of process 500, the network management system can configure the communication network to use a route implementing the determined path for the demand, consistent with disclosed embodiments. In some embodiments, the network management system can provide instructions to other components of the communication network (e.g., nodes 120, database 170, or the like). In some embodiments, the instructions can be received or retrieved by the node(s) of the communication network from the network management system or another component of the communication network (e.g., database 170, another node of the communication network). When processed by the components, the instructions can cause the components to (e.g., collectively) implement the route corresponding to the determined path for the demand.

Figure 8:
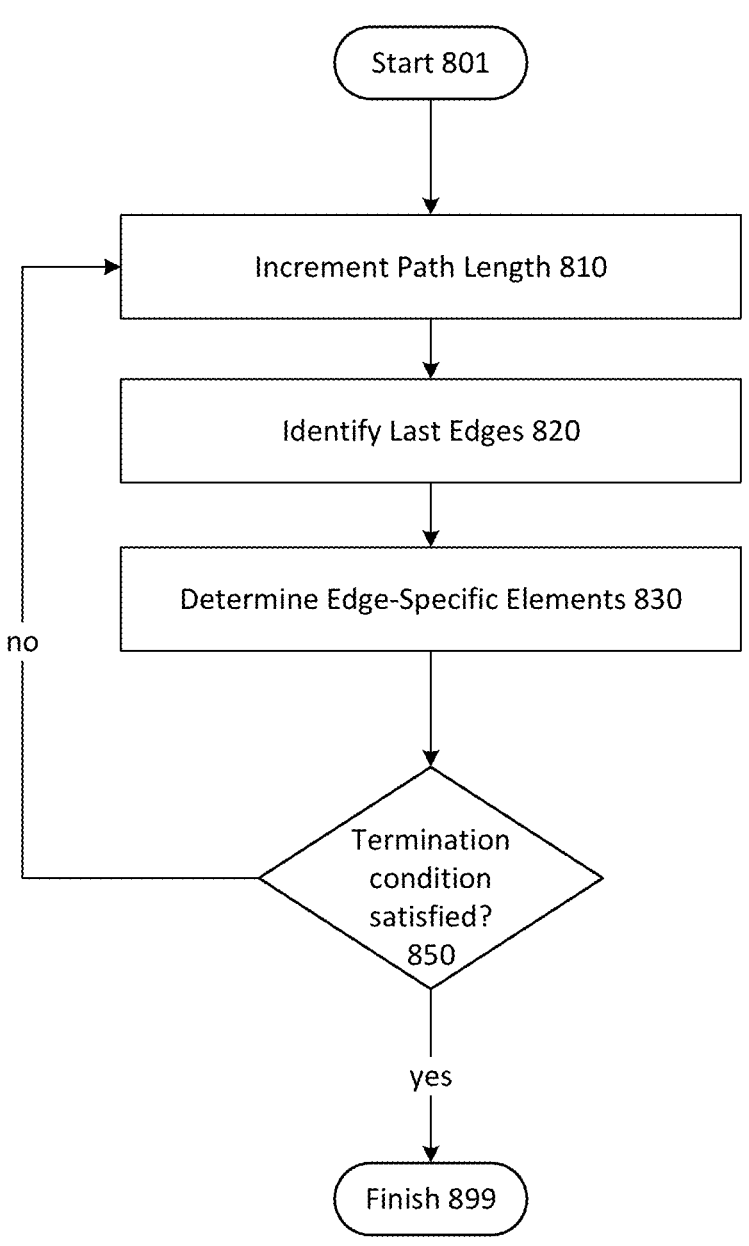
FIG. 8 depicts an exemplary dynamic programming process for determining a path length for which a valid path exists on a network graph, subject to a connectivity relation, consistent with disclosed embodiments.

FIG. 8 depicts an exemplary dynamic programming process 800 for determining a path length for which a valid path exists on a network graph, subject to a connectivity relation, consistent with disclosed embodiments. Process 800 can include incrementing a path length, identifying a set of new last edges based the path length and determining edge-specific elements. For convenience of description, process 800 is described herein as being performed by a network management system (e.g., network management system 150, or the like). However, the disclosed embodiments are not so limited. In some embodiments, process 800 can be performed by another component of the communications network (e.g., one or more of nodes 120, or the like), or another system. Consistent with disclosed embodiments, process 800 can be performed as part of another process (e.g., process 500, or the like), or as a stand-alone process. For convenience of description, the process 800 is described as proceeding from the source to the terminal vertex. However, the disclosed embodiments are not so limited. In some embodiments, process 800 can proceed from the terminal to the source vertex. For convenience of description, the path length is described as a number that is initialized to zero and then incremented to a value equal to the number of edges in a valid path between the source and terminal vertices. However, the disclosed embodiments are not so limited and encompass any functional equivalent to incrementing a number from zero (e.g., starting at a non-zero value, incrementing an alphabetical character, or the like).

In step 801, process 800 can start. The network management system can obtain a network graph and a connectivity set. The network graph can have a source vertex and a terminal vertex. The elements of the connectivity set can be associated with elements of a structure. For convenience of description, the connectivity set is described as including valid, consecutive edge pairs and edges (e.g., the edges connected to the source vertex). However, as described herein, the disclosed embodiments are not so limited. The structure can include an additive identity element and additional elements. The structure can have characteristic two. In some embodiments, the structure can be the field $F_q$, as described herein.

In step 810 of process 800, the network management system can increment the path length. For convenience of description, each iteration of process 800 is described as beginning when process 800 reaches step 810. For example, in an initial iteration, process 800 can proceed from step 801 to step 810 and the path length can be incremented from 0 to 1. In a subsequent iteration, process 800 can return from step 850 to step 810 and the path length can be incremented from i to i+1.

In step 820 of process 800, the network management system can identify last edges. In a first iteration, the last edges can be the edges connected to the source vertex. In subsequent iterations, the last edges can include edges connected to prior edges (e.g., the last edges of the prior iteration of process 800) through prior vertices (e.g., the last vertices of the prior iteration of process 800. In some embodiments, the last edges can be restricted to edges that form a valid edge pair with a prior edge. The vertex of the last edge that is not connected to the prior vertex can be the last vertex.

For example, the last edges in the first iteration include the edges connected to the source vertex. The other endpoints of these edges can form the last vertices in the first iteration. In the second iteration, the edges connected to the source vertex can be the prior edges and the non-source vertex endpoints of these edges can be the prior vertices. The last edges in the second iteration can each connect to a prior edge through a prior vertex (and in some embodiments can form a valid edge pair in the connectivity set with the prior edge). The other endpoints of these edges can form the last edges in the second iteration.

In step 830 of process 800, the network management system can determine edge-specific elements for the last edges. In the first iteration, the edge-specific element for each last edge can be the element of the connectivity set corresponding to that edge. In subsequent iterations, the edge-specific element for a last edge $e_{yz}$ can be:

$$f(W_l(s, e_{yz}, z)) = \sum_{e_{xy} \in N(y) \setminus \{e_{yz}\}} f(W_{l-1}(s, e_{xy}, y)) \cdot f(e_{xy}, e_{yz})$$

where l is the current path length, s is the source vertex, $e_{yz}$ is a last edge connecting prior vertex y to last vertex z, $N(y)$ is the set of edges connecting to prior vertex y, $W_{l-1}(s, e_{xy}, y)$ is the edge-specific element for path length l−1, prior last edge $e_{xy}$ and prior vertex y, and $f(e_{xy}, e_{yz})$ is the element of the structure corresponding to the edge pair $\{e_{xy}, e_{yz}\}$ in the connectivity set.

As may be appreciated, if a path having the last edge $e_{xy}$ of length exactly l−1 connects the source vertex s and vertex y, then $f(W_{l-1}(s, e_{xy}, y))$ was determined in the prior iteration of process 800. In some embodiments, if no such path exists, then $e_{xy}$ does not contribute to $f(W_l(s, e_{yz}, z))$ (e.g., the sum is not calculated over $e_{xy}$, $f(W_{l-1}(s, e_{xy}, y))$ is deemed to be the additive identity element, or any other suitable approach). Similarly, if the edge pair $\{e_{xy}, e_{yz}\}$ is not a valid edge pair, then $e_{xy}$ does not contribute to $f(W_l(s, e_{yz}, z))$ (e.g., the sum is not calculated over $e_{xy}$, $f(e_{xy}, e_{yz})$ is deemed to be the additive identity element, or any other suitable approach). In this manner, the value of $f(W_l(s, e_{yz}, z))$ can be determined from previously determines values of $f(W_{l-1}(s, e_{xy}, y))$ and elements of the connectivity set.

In some embodiments, the network management system can iterate through the last edges until an edge-specific element has been determined for each of the last edges. The disclosed embodiments are not limited to any particular approach to iterating through the last edges. For example, the order can be random, or the order can be deterministic.

In some embodiments, the network management system can iterate through a portion of the last edges. For example, in some embodiments, the network management system can identify a subset of the last edges having as last vertices the terminal vertex. The network management system may determine the edge-specific elements for this subset of last edges, then sum these edge-specific elements to generate the path-length element:

$$T_l(s, z) = \sum_{e_{yz} \in N(z)} f(W_l(s, e_{yz}, z))$$

where N(z) is the subset of last edges. The network management system may then proceed to step 840. If the termination condition is not satisfied, the network management system can return to step 830 to complete the determination of the edge-specific elements for the remaining last edges. Alternatively, the network management system can determine the edge-specific elements for all the last edges, then identify the subset of the last edges having as last vertices the terminal vertex, then generate the path-length element.

Consistent with disclosed embodiments, after generating the path-length element or generating all the edge-specific elements, process 800 can proceed to step 850.

In steps 850 of process 800, the network management system can determine whether a termination condition has been satisfied. When the termination condition has been satisfied, process 800 can proceed to step 899. Otherwise, process 800 can return to step 810.

In some embodiments, as described herein, the termination condition can be satisfied when the path-length element has been generated and the path-length element is not the additive identity element. In some embodiments, as described herein, the termination condition can be satisfied when the path-length element has been generated and the path-length element is the additive identity element. In such embodiments, the connectivity set can be re-associated with the structure (e.g., in case the path-length element incidentally evaluated to the additive identity element). In some embodiments, the termination condition can be satisfied when an iteration number or duration condition has been satisfied.

In step 899, process 800 can terminate. In some embodiments, the network management system can return a result based on the satisfied termination condition. The network management system can return the result to a user, another component of the communication system, or another system. In some embodiments, the network management system can use the result in a subsequent step of another process (e.g., in step 540 of process 500).

For example, when network management system determined a path-length element in step 850 and the path-length element is not the additive identity element, the network management system can return the path-length. In some embodiments, the network management system can use the path length in a subsequent step of another process (e.g., in step 540 of process 500). As an additional example, when network management system determined a path-length element in step 850 and the path-length element is the additive identity element, the network management system can return a suitable indication. In some embodiments, the network management system may then re-associate the elements of the structure with the elements of the connectivity set and perform process 800 again. As a further example, when an iteration number or duration condition was satisfied in step 850, the network management system can return a warning or error message, as described herein.

Figure 9A:
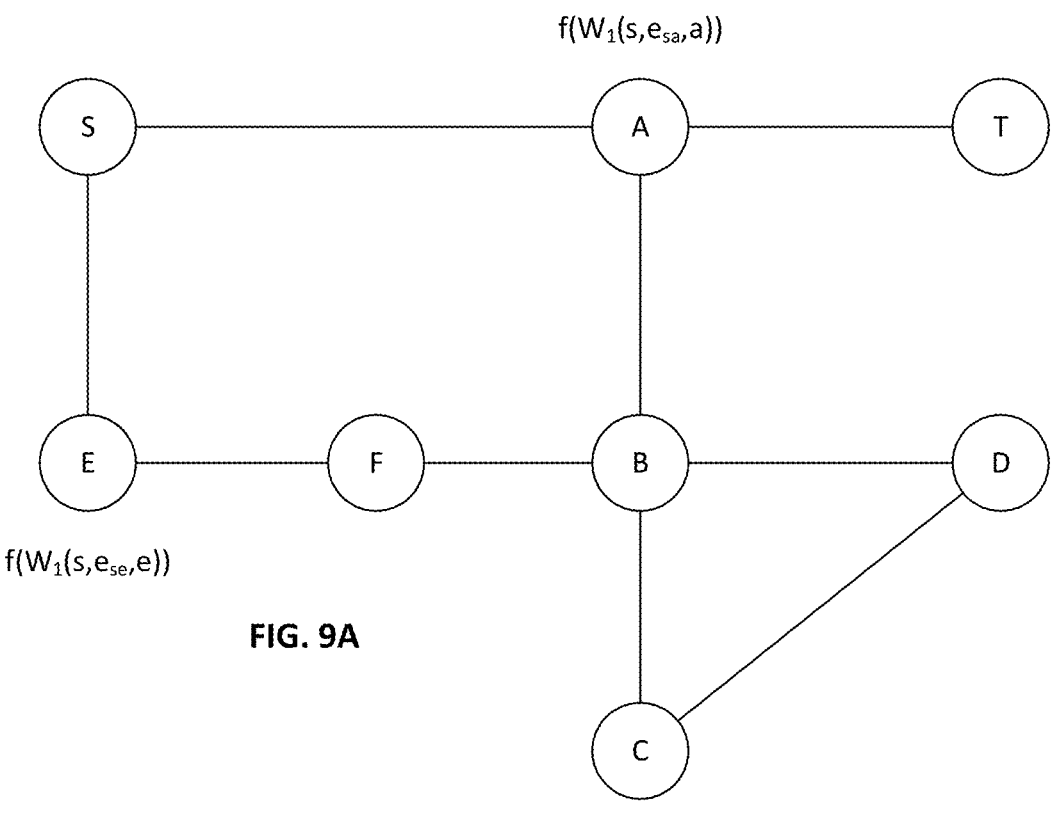
FIGS. 9A to 9H depict the application of the exemplary dynamic programming process of FIG. 8 to the network of FIGS. 3 and 4, consistent with disclosed embodiments.

FIGS. 9A to 9H depict the application of the exemplary dynamic programming process of FIG. 8 to the network of FIGS. 3 and 4, consistent with disclosed embodiments. FIG. 9A depicts a first iteration of process 800. The set of last edges is $e_{sa}$ and $e_{se}$. The two edge-specific elements are:

$$f(W_1(s, e_{sa}, a)) = f(e_{sa})$$

$$f(W_1(s, e_{se}, e)) = f(e_{se})$$

Figure 9B:
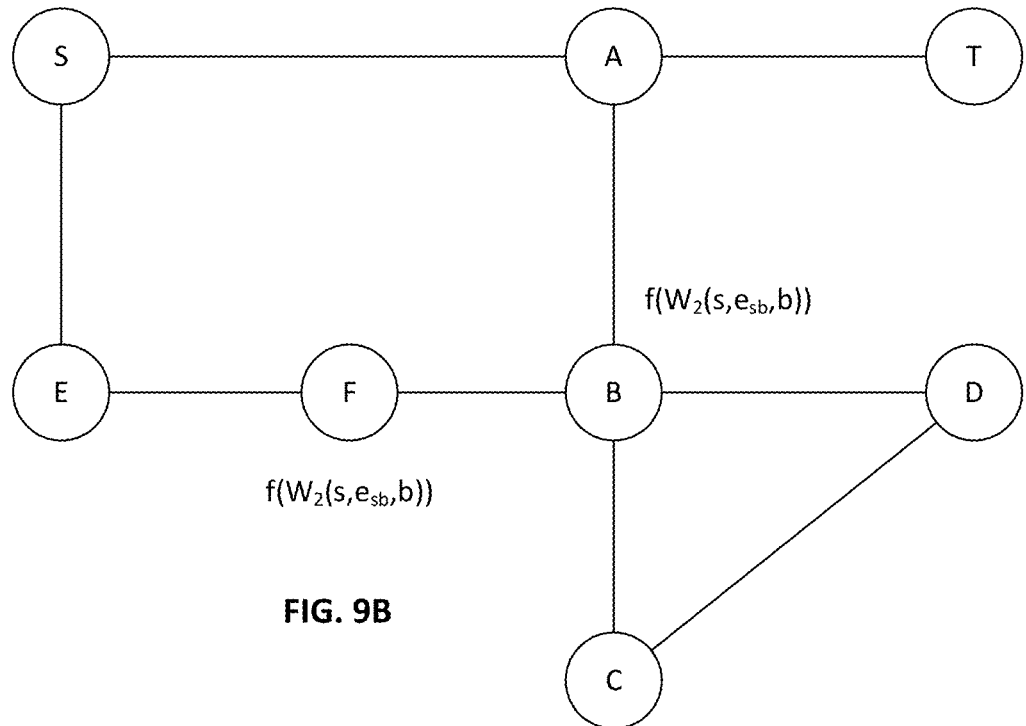

FIG. 9B depicts a second iteration of process 800. The prior edges are $e_{sa}$ and $e_{se}$. The only valid edge pairs containing these edges are $\{e_{se}, e_{ef}\}$ and $\{e_{sa}, e_{ab}\}$. So, the last edges are $e_{ef}$ and $e_{ab}$. The prior vertices are e and a and the last vertices are f and b. The two edge-specific elements are:

$$f(W_2(s, e_{ab}, b)) =$$

$$\sum_{e_{xy} \in N(a) \setminus \{e_{ab}\}} f(W_1(s, e_{xy}, a)) \cdot f(e_{xy}, e_{ab}) = f(e_{sa}) \cdot f(e_{sa}, e_{ab})$$

$$f(W_2(s, e_{ef}, f)) =$$

$$\sum_{e_{xy} \in N(e) \setminus \{e_{ef}\}} f(W_1(s, e_{xy}, e)) \cdot f(e_{xy}, e_{ef}) = f(e_{se}) \cdot f(e_{se}, e_{ef})$$

Figure 9C:
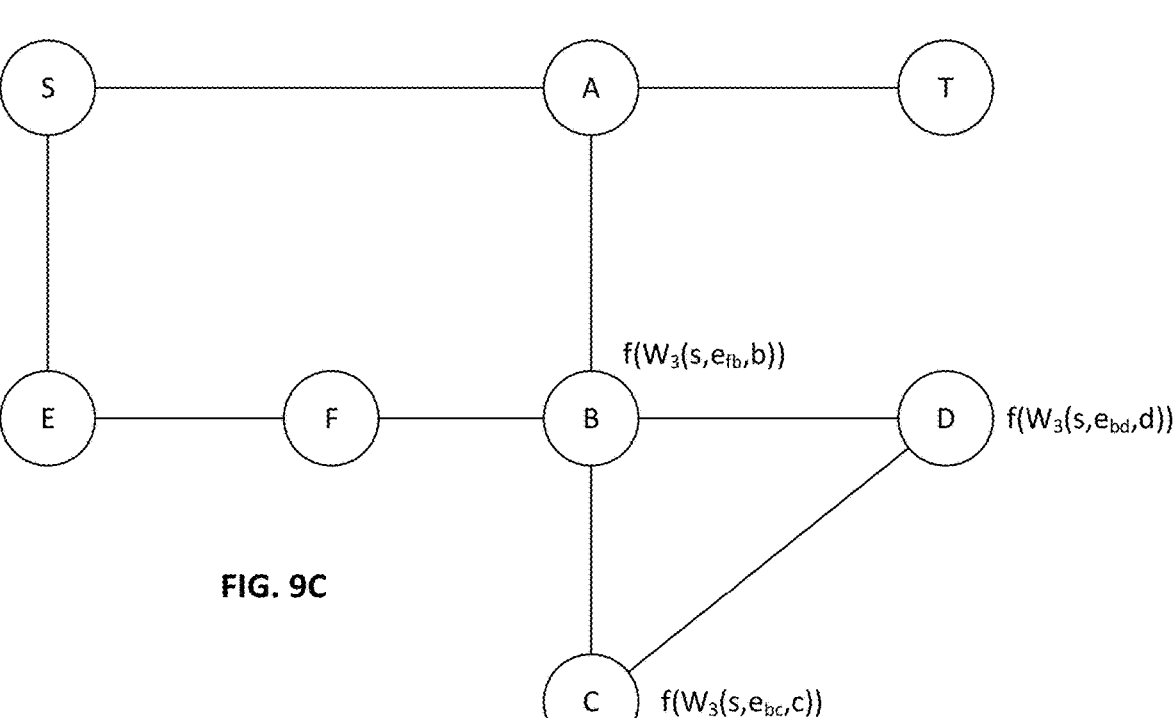

FIG. 9C depicts a third iteration of process 800. The prior edges are $e_{ef}$ and $e_{ab}$. The only valid edge pairs containing these edges are $\{e_{sf}, e_{fb}\}$, $\{e_{ab}, e_{bc}\}$, and $\{e_{ab}, e_{bd}\}$. As may be appreciated, paths not retraced, so $\{e_{se}, e_{ef}\}$ and $\{e_{sa}, e_{ab}\}$ are not a valid edge pair. So, the last edges are $e_{fb}$, $e_{bc}$, and $e_{bd}$. The prior vertices are f and b and the last vertices are c for $e_{bc}$, d for $e_{bd}$, and b for $e_{fb}$. The three edge-specific elements are:

$$f(W_3(s, e_{bc}, c)) =$$

$$\sum_{e_{xy} \in N(b) \setminus \{e_{bc}\}} f(W_2(s, e_{xy}, b)) \cdot f(e_{xy}, e_{bc}) = f(e_{sa}) \cdot f(e_{sa}, e_{ab}) \cdot f(e_{ab}, e_{bc})$$

$$f(W_3(s, e_{bd}, d)) =$$

$$\sum_{e_{xy} \in N(b) \setminus \{e_{bd}\}} f(W_2(s, e_{xy}, b)) \cdot f(e_{xy}, e_{bd}) = f(e_{sa}) \cdot f(e_{sa}, e_{ab}) \cdot f(e_{ab}, e_{bd})$$

$$f(W_3(s, e_{fb}, b)) =$$

$$\sum_{e_{xy} \in N(f) \setminus \{e_{fb}\}} f(W_2(s, e_{xy}, f)) \cdot f(e_{xy}, e_{fb}) = f(e_{se}) \cdot f(e_{se}, e_{ef}) \cdot f(e_{ef}, e_{fb})$$

Figure 9D:
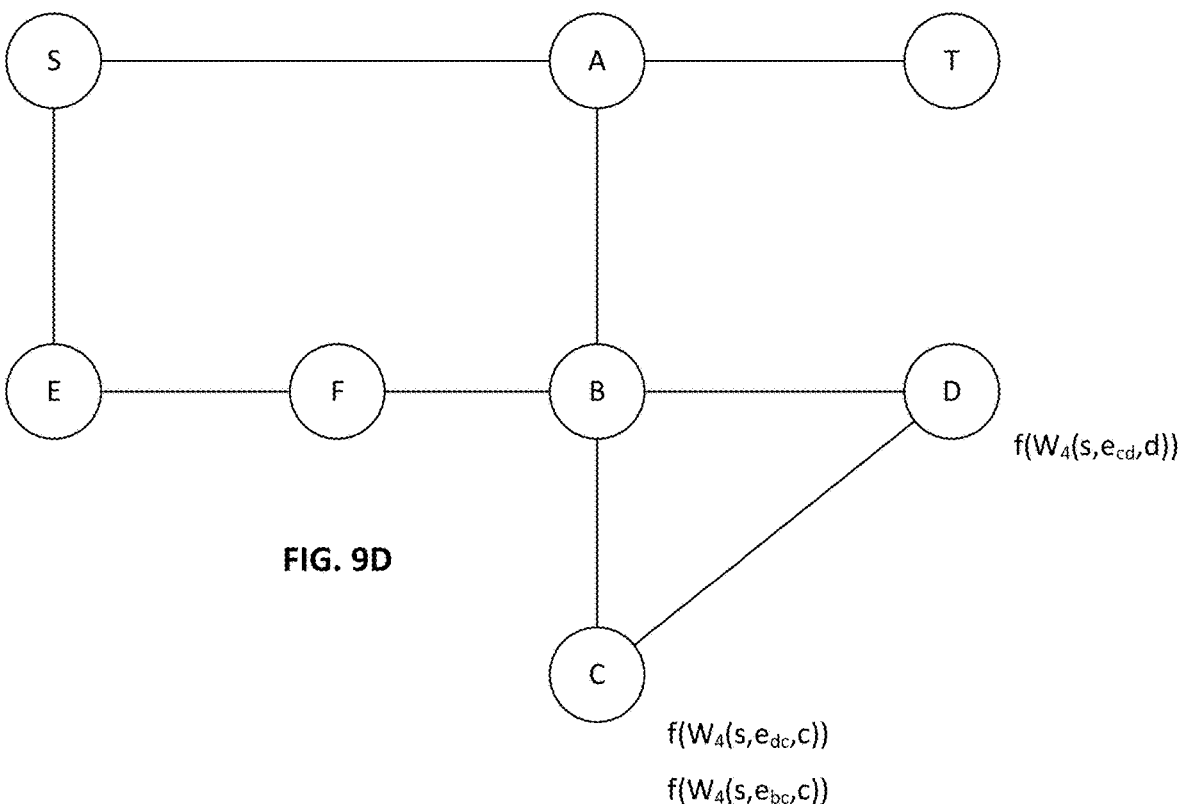

FIG. 9D depicts a fourth iteration of process 800. The prior edges are $e_{fb}$, $e_{bc}$, and $e_{bd}$. The only valid edge pairs containing these edges are $\{e_{fb}, e_{bc}\}$, $\{e_{bc}, e_{cd}\}$, and $\{e_{bd}, e_{dc}\}$. So, the last edges are $e_{bc}$, $e_{cd}$, and $e_{dc}$. The prior vertices are b, c, and d and the last vertices are c for $e_{bc}$, d for $e_{cd}$, and c for $e_{dc}$. The three edge-specific elements are:

$$f(W_4(s, e_{cd}, d)) = \sum_{e_{xy} \in N(c) \setminus \{e_{cd}\}} f(W_3(s, e_{xy}, c)) \cdot f(e_{xy}, e_{cd}) =$$

$$f(e_{sa}) \cdot f(e_{sa}, e_{ab}) \cdot f(e_{ab}, e_{bc}) \cdot f(e_{bc}, e_{cd})$$

$$f(W_4(s, e_{dc}, c)) = \sum_{e_{xy} \in N(d) \setminus \{e_{dc}\}} f(W_3(s, e_{xy}, d)) \cdot f(e_{xy}, e_{dc}) =$$

$$f(e_{sa}) \cdot f(e_{sa}, e_{ab}) \cdot f(e_{ab}, e_{bd}) \cdot f(e_{bd}, e_{dc})$$

$$f(W_4(s, e_{bc}, c)) = \sum_{e_{xy} \in N(b) \setminus \{e_{bc}\}} f(W_3(s, e_{xy}, b)) \cdot f(e_{xy}, e_{bc}) =$$

$$f(e_{se}) \cdot f(e_{se}, e_{ef}) \cdot f(e_{ef}, e_{fb}) \cdot f(e_{fb}, e_{bc})$$

Figure 9E:
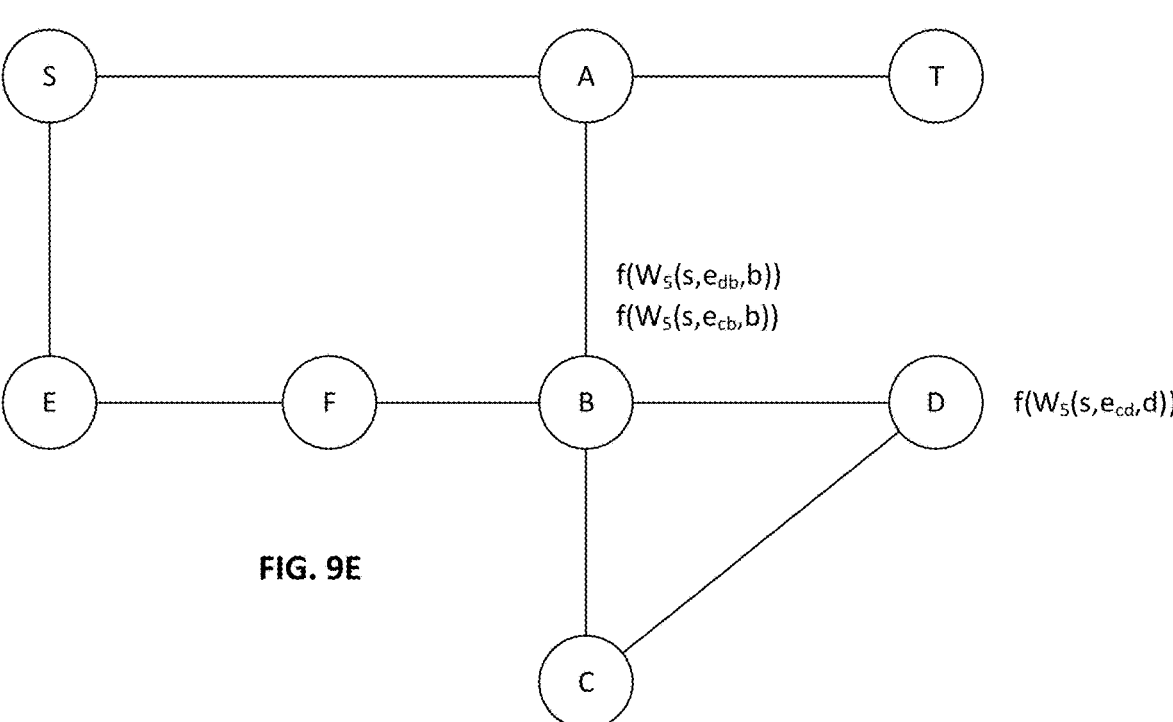

FIG. 9E depicts a fifth iteration of process 800. The prior edges are $e_{bc}$, $e_{cd}$, and $e_{dc}$. The only valid edge pairs containing these edges are $\{e_{bc}, e_{cd}\}$, $\{e_{cd}, e_{db}\}$, and $\{e_{dc}, e_{cb}\}$. So, the last edges are $e_{cd}$, $e_{db}$, and $e_{cb}$. The prior vertices are c, d, and c and the last vertices are d for $e_{cd}$, b for $e_{db}$, and b for $e_{cb}$. The three edge-specific elements are:

$$f(W_5(s, e_{db}, b)) = \sum_{e_{xy} \in N(d) \setminus \{e_{db}\}} f(W_4(s, e_{xy}, b)) \cdot f(e_{xy}, e_{db}) =$$

$$f(e_{sa}) \cdot f(e_{sa}, e_{ab}) \cdot f(e_{ab}, e_{bc}) \cdot f(e_{bc}, e_{cd}) \cdot f(e_{cd}, e_{db})$$

$$f(W_5(s, e_{cb}, b)) = \sum_{e_{xy} \in N(c) \setminus \{e_{cb}\}} f(W_4(s, e_{xy}, b)) \cdot f(e_{xy}, e_{cb}) =$$

$$f(e_{sa}) \cdot f(e_{sa}, e_{ab}) \cdot f(e_{ab}, e_{bd}) \cdot f(e_{bd}, e_{dc}) \cdot f(e_{dc}, e_{cb})$$

$$f(W_5(s, e_{cd}, d)) = \sum_{e_{xy} \in N(c) \setminus \{e_{cd}\}} f(W_4(s, e_{xy}, c)) \cdot f(e_{xy}, e_{cd}) =$$

$$f(e_{se}) \cdot f(e_{se}, e_{ef}) \cdot f(e_{ef}, e_{fb}) \cdot f(e_{fb}, e_{bc}) \cdot f(e_{bc}, e_{cd})$$

Figure 9F:
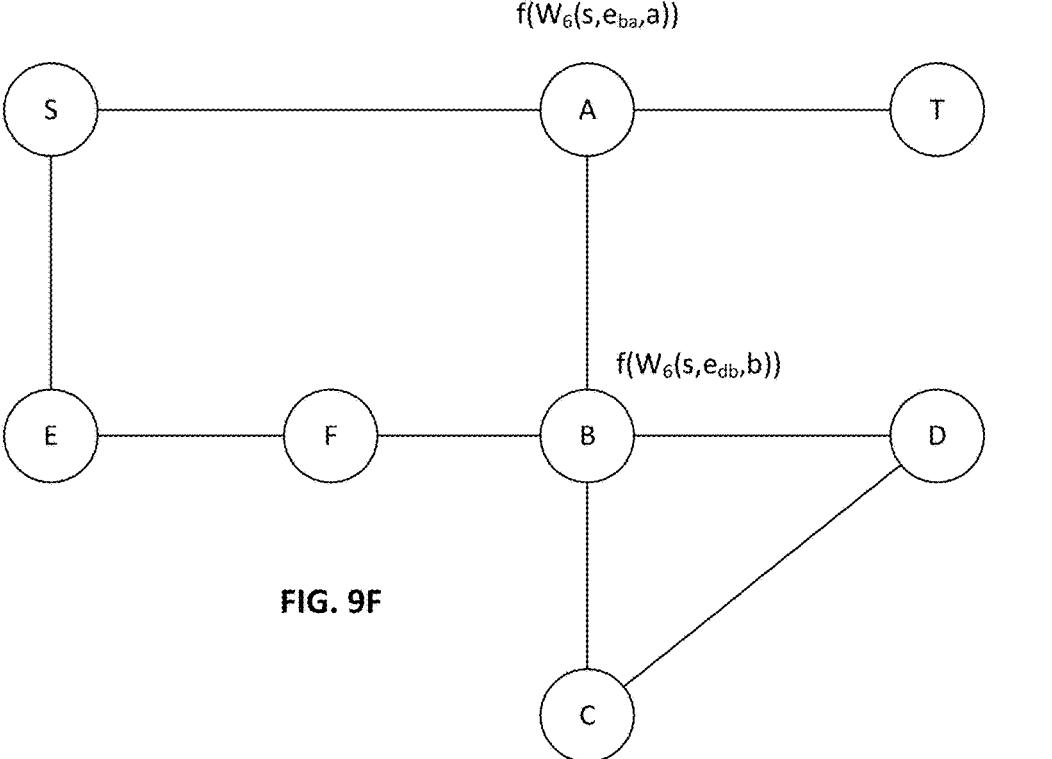

FIG. 9F depicts a sixth iteration of process 800. The prior edges are $e_{cd}$, $e_{db}$, and $e_{cb}$. The only valid edge pairs containing these edges are $\{e_{cd}, e_{db}\}$, $\{e_{db}, e_{ba}\}$, and $\{e_{cb}, e_{ba}\}$. So, the last edges are $e_{db}$ and $e_{ba}$. The prior vertices are d and b, and the last vertices are d for $e_{db}$ and a for $e_{ba}$. The two edge-specific elements are:

$$f(W_6(s, e_{ba}, b)) = \sum_{e_{xy} \in N(b) \setminus \{e_{ba}\}} f(W_5(s, e_{xy}, b)) \cdot f(e_{xy}, e_{ba}) =$$

$$f(W_5(s, e_{cb}, b)) \cdot f(e_{cb}, e_{ba}) + f(W_5(s, e_{db}, b)) \cdot f(e_{db}, e_{ba}) =$$

$$f(e_{sa}) \cdot f(e_{sa}, e_{ab}) \cdot f(e_{ab}, e_{dd}) \cdot f(e_{bd}, e_{dc}) \cdot f(e_{dc}, e_{cb}) \cdot f(e_{cb}, e_{ba}) +$$

$$f(e_{sa}) \cdot f(e_{sa}, e_{ab}) \cdot f(e_{ab}, e_{bc}) \cdot f(e_{bc}, e_{cd}) \cdot f(e_{cd}, e_{db}) \cdot f(e_{db}, e_{ba}) = 0$$

$$f(W_6(s, e_{db}, b)) = \sum_{e_{xy} \in N(d) \setminus \{e_{db}\}} f(W_5(s, e_{xy}, d)) \cdot f(e_{xy}, e_{db}) =$$

$$f(e_{se}) \cdot f(e_{se}, e_{ef}) \cdot f(e_{ef}, e_{fb}) \cdot f(e_{fb}, e_{bc}) \cdot f(e_{bc}, e_{cd}) \cdot f(e_{cd}, e_{db})$$

As may be appreciated, $f(W_6(s, e_{ba}, b))$ equals the additive identity element because the structure has characteristic two and because $f(e_{xy}, e_{yz}) = f(e_{zy}, e_{yx})$.

Figures 9G, 9H:
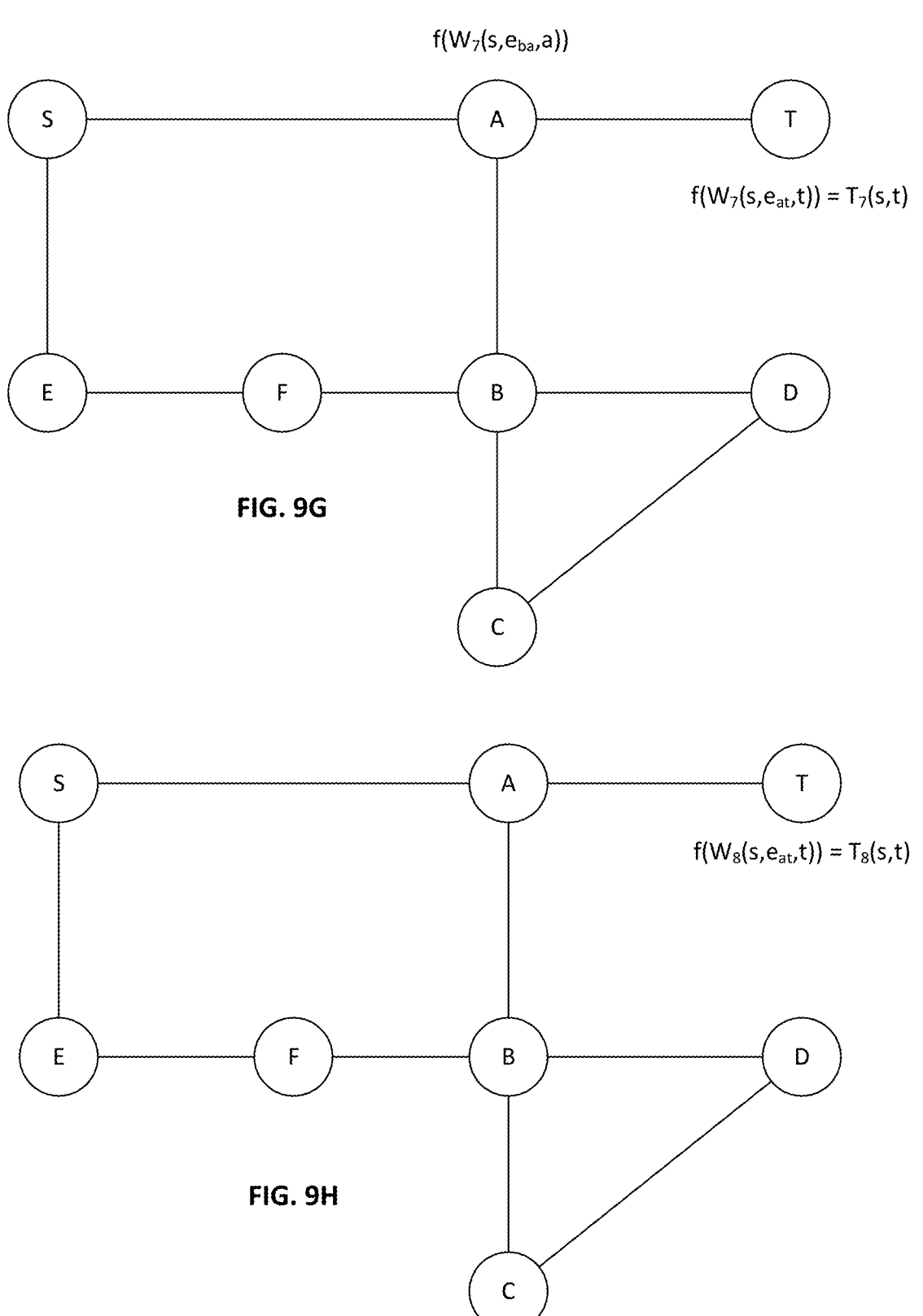

FIG. 9G depicts a seventh iteration of process 800. The prior edges are $e_{db}$ and $e_{ba}$. The only valid edge pairs containing these edges are $\{e_{db}, e_{ba}\}$ and $\{e_{ba}, e_{at}\}$. So, the last edges are $e_{ba}$ and $e_{at}$. The prior vertices are b and a and the last vertices are a for $e_{ba}$ and t for $e_{at}$. The two edge-specific elements are:

$$f(W_7(s, e_{at}, t)) = \sum_{e_{xy} \in N(a) \setminus \{e_{at}\}} f(W_6(s, e_{xy}, a)) \cdot f(e_{xy}, e_{at}) = 0$$

$$f(W_7(s, e_{ba}, a)) =$$

$$\sum_{e_{xy} \in N(b) \setminus \{e_{ba}\}} f(W_6(s, e_{xy}, b)) \cdot f(e_{xy}, e_{ba}) = f(e_{se}) \cdot f(e_{se}, e_{ef}) \cdot$$

$$f(e_{ef}, e_{fb}) \cdot f(e_{fb}, e_{bc}) \cdot f(e_{bc}, e_{cd}) \cdot f(e_{cd}, e_{db}) \cdot f(e_{db}, e_{ba})$$

The network management system can identify that the terminal vertex t is a last vertex and generate the path-length element including the edge-specific elements that end on t. In this case, the only such edge-specific element corresponds to edge $e_{at}$ and is 0. Thus $T_7(s, t) = 0$.

FIG. 9H depicts an eighth iteration of process 800. The prior edge is $e_{ba}$. The only valid edge pair containing this edge is $\{e_{ba}, e_{at}\}$. So, the last edge is $e_{at}$. The prior vertex is a and the last vertex is t for $e_{at}$. The edge-specific element is:

$$f(W_8(s, e_{at}, t)) =$$

$$\sum_{e_{xy} \in N(a) \setminus \{e_{at}\}} f(W_7(s, e_{xy}, a)) \cdot f(e_{xy}, e_{at}) = f(e_{se}) \cdot f(e_{se}, e_{ef}) \cdot$$

$$f(e_{ef}, e_{fb}) \cdot f(e_{fb}, e_{bc}) \cdot f(e_{bc}, e_{cd}) \cdot f(e_{cd}, e_{db}) \cdot f(e_{db}, e_{ba}) \cdot f(e_{ba}, e_{at})$$

The network management system can identify that the terminal vertex t is a last vertex and generate the path-length element including the edge-specific elements that end on t. In this case, the only such edge-specific element corresponds to edge $e_{at}$ and is $f(W_8(s, e_{at}, t))$, which may not evaluate to the additive identity element (depending on the assignment of elements of $F_q$ to the elements of the connectivity set).

Figure 10:
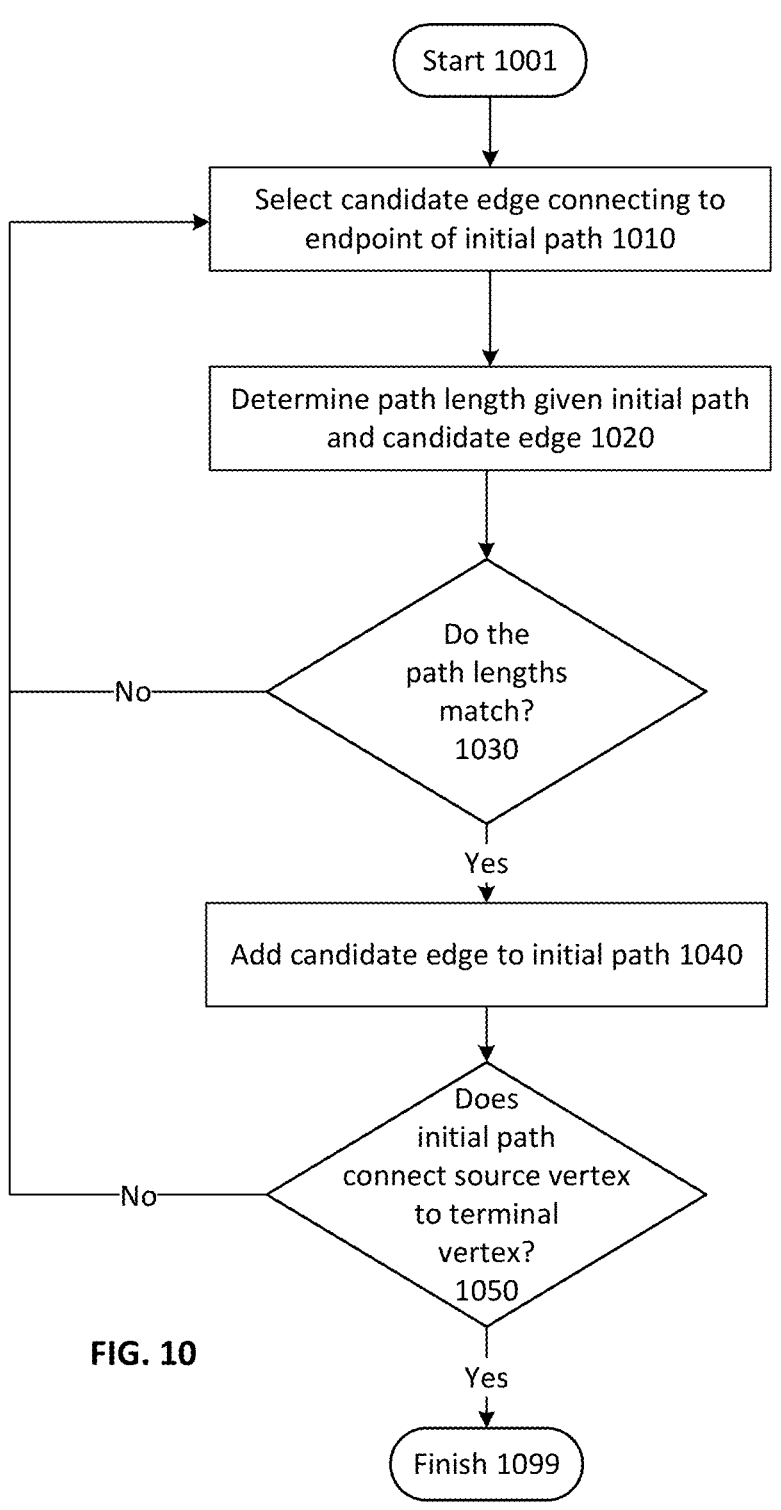
FIG. 10 depicts an exemplary dynamic programming process for determining a valid path, given a predetermined path length, consistent with disclosed embodiments.

FIG. 10 depicts an exemplary dynamic programming process 1000 for determining a valid path, given a predetermined path length, consistent with disclosed embodiments. Process 1000 can include iteratively extending an initial path. In each iteration, a candidate edge can be connected to the endpoint of the initial path. A path length is then determined, given the initial path and the candidate edge. If this determined path length does not match the predetermined path length, then the candidate edge is not on a valid path. Another candidate edge can be selected and the process repeated until a candidate edge on a valid path is identified. The identified candidate edge can be appended to the initial path. The iterative extension of the initial path can continue until the terminal vertex is reached.

For convenience of description, process 1000 is described herein as being performed by a network management system (e.g., network management system 150, or the like). However, the disclosed embodiments are not so limited. In some embodiments, process 1000 can be performed by another component of the communications network (e.g., one or more of nodes 120, or the like), or another system. Consistent with disclosed embodiments, process 1000 can be performed as part of another process (e.g., process 500, or the like), or as a stand-alone process. For convenience of description, the process 1000 is described as proceeding from the source to the terminal vertex. However, the disclosed embodiments are not so limited. In some embodiments, process 1000 can proceed from the terminal to the source vertex. For convenience of description, the path length is described as a number that is initialized to zero and then incremented to a value equal to the number of edges in a valid path between the source and terminal vertices. However, the disclosed embodiments are not so limited and encompass any functional equivalent to incrementing a number from zero (e.g., starting at a non-zero value, incrementing an alphabetical character, or the like).

In step 1001, process 1000 can start. The network management system can obtain a network graph and a connectivity set. The network graph can have a source vertex and a terminal vertex. The elements of the connectivity set can be associated with elements of a structure. For convenience of description, the connectivity set is described as including valid consecutive edge pairs and edges (e.g., edges connected to the source vertex). However, as described herein, the disclosed embodiments are not so limited. The structure can include an additive identity element and additional elements. The structure can have characteristic two. In some embodiments, the structure can be the field $F_q$, as described herein.

The network management system can obtain a predetermined path length. As described herein, a valid path connecting the source and terminal vertices and having this path length can exist on the network graph. In some embodiments, the network management system can receive or retrieve the predetermined path length from another component of the communication system (e.g., one of nodes 120, database 170, or the like), a user of the communication system, or another system. In some embodiments, the network management system can determine the predetermined path length using another process (e.g., process 800, or the like).

In step 1010 of process 1000, the network management system can select a candidate edge connected to an endpoint of an initial path. For convenience of description, each iteration of process 1000 is described as beginning when process 1000 reaches step 1010 from step 1001 or step 1050. For example, in an initial iteration, process 1000 can proceed from step 1001 to step 1010. In a subsequent iteration, process 1000 can return from step 1050 to step 1010. In the initial iteration, the initial path can be the null set and the endpoint can be deemed to be the source vertex. The network management system can then select among edges connected to the source vertex. In subsequent iterations, the initial path can exist, and the network management system can select among edges connected to the non-source vertex endpoint of the initial path.

In step 1020 of process 1000, the network management system can determine a path length given the initial path and the candidate edge. In some embodiments, the network management system can use a variant of process 800 to determine the path length.

In an initial iteration of this modified version of process 800, the path length can be initialized to the length of the initial path (e.g., in step 801). The path length can then be incremented (e.g., in step 810) and last edges can be identified (e.g., in step 820). The last edges can be identified using the candidate edge. For example, the last edges can be the other edges in the edge pairs that include the candidate edge (and that do not retrace the candidate edge). In some embodiments, these edge pairs can be limited to valid edge pairs (e.g., edge pairs that satisfy the connectivity relationship). For each last edge, the vertex connecting the candidate edge and the last edge can be the prior vertex and the other vertex can be the last vertex. The network management system can then determine edge-specific elements for each last edge as follows.

$$f\left(W_{1+|p^o e_{xy}|}(s, e_{yz}, z)\right) =$$

$$f\left(W_{|p^o e_{xy}|}(s, e_{xy}, y)\right) \cdot f(e_{xy}, e_{yz}) = f(p^o e_{xy}) \cdot f(e_{xy}, e_{yz})$$

where p is the initial path, $e_{xy}$ is the candidate edge, $e_{yz}$ is the last edge, $p^o e_{xy}$ is the initial path concatenated with the candidate edge, $|p^o e_{xy}|$ is the length of the initial path concatenated with the candidate edge, $f(p^o e_{xy})$ is the element of the structure associated with the concatenation of the initial path and candidate edge (e.g., the product of elements associated with the edge pairs in $p^o e_{xy}$ and the initial edge of $p^o e_{xy}$), and $f(e_{xy}, e_{yz})$ is the element of the structure associated with the edge pair connectivity element $\{e_{xy}, e_{yz}\}$. As may be appreciated, subsequent iterations of process 800 can proceed as described with regards to FIG. 8. Upon completion, the variant of process 800 can return a path length or an indication that no path length could be determined. This path length can be denoted $l(s, p^o e_{xy}, t)$, where s is the source vertex, $p^o e_{xy}$ is the initial path concatenated with the candidate edge, and t is the terminal vertex.

In step 1030 of process 1000, the network management system can determine whether $l(s, p^o e_{xy}, t)$ matches the predetermined path length. If the path lengths do not match (or no path length $l(s, p^o e_{xy}, t)$ could be determined in step 1020) then process 1000 can return to step 1010 and the network management system can select another candidate edge connected to the endpoint of the initial path. If the path lengths do match, then process 1000 can proceed to step 1040.

In step 1040 of process 1000, the network management system can append the candidate edge to the end of the initial path, thereby extending the initial path.

In step 1050 of process 1000, the network management system can determine whether the initial path extends from the source vertex to the terminal vertex. If so, process 1000 can proceed to step 1099. Otherwise, process 1000 can return to step 1010.

In step 1099, process 1000 can terminate. In some embodiments, the network management system can return the initial path. The network management system can return the initial path a user, another component of the communication system, or another system. In some embodiments, the network management system can use the initial path in a subsequent step of another process (e.g., in step 550 of process 500).

Figure 11A:
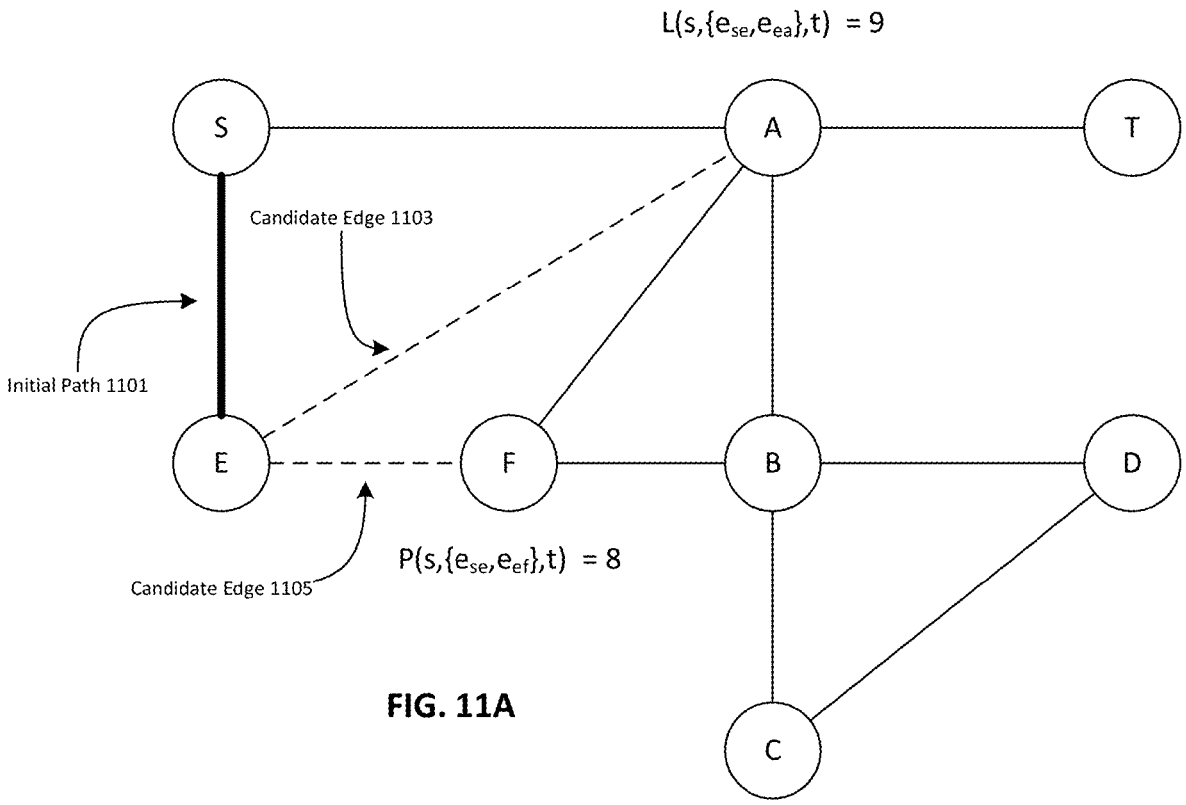
FIGS. 11A and 11B each depict an iteration of the exemplary dynamic programming process of FIG. 10, consistent with disclosed embodiments.
Figure 11B:
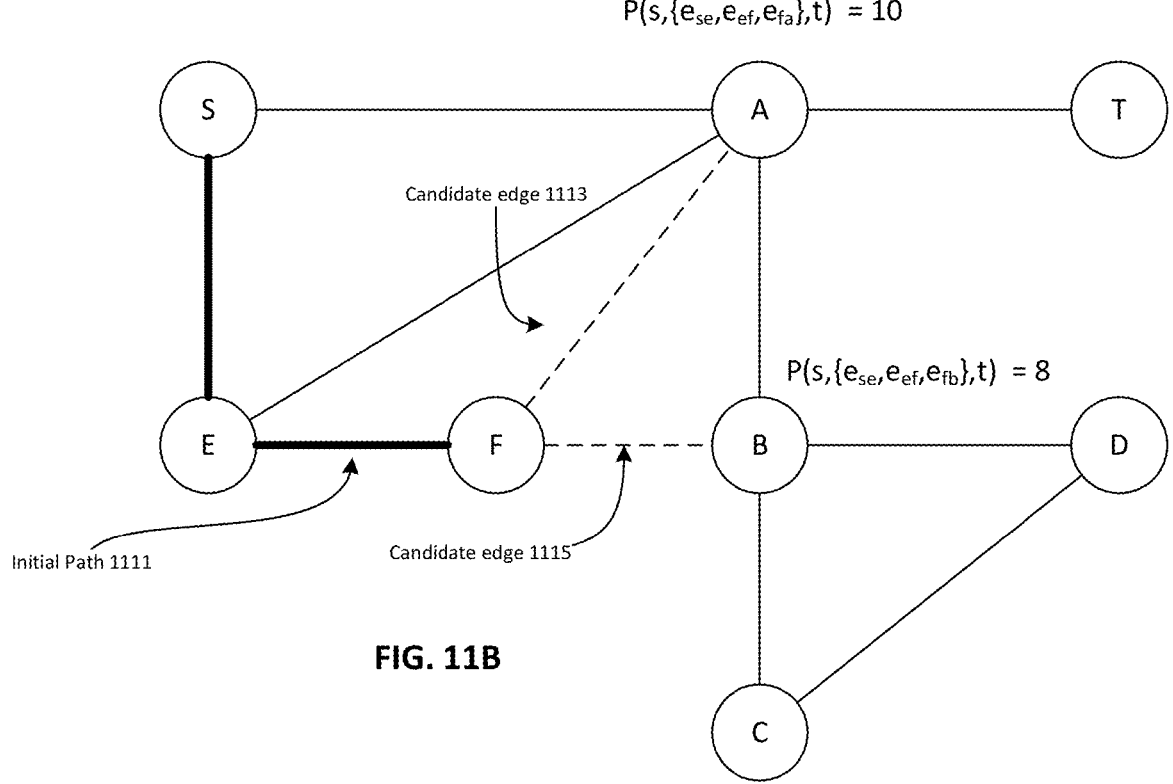

FIGS. 11A and 11B each depict an iteration of process 1000, consistent with disclosed embodiments. These examples concern a modified version of the network graph depicted in FIGS. 3 and 4. The modified network graph includes a first additional edge $e_{ea}$ and a second additional edge $e_{fa}$. A modified connectivity set additionally includes the edge pairs $\{e_{se}, e_{ea}\}$, $\{e_{ea}, e_{ab}\}$, $\{e_{ef}, e_{fa}\}$, and $\{e_{fa}, e_{ab}\}$. These modifications do not affect the determination of the shortest path length for which a valid path exists that connects the source vertex s and the terminal vertex t. The shortest path length remains 8 (as determined with regards to FIGS. 9A to 911).

FIG. 11A depicts a second iteration of process 1000. In this second iteration, the initial path is $e_{se}$. The set of candidate edges include the edges connected to vertex e (e.g., $e_{ea}$ and $e_{ef}$). In this example, the network management system can select candidate edge $e_{ea}$ (e.g., candidate edge 1103) and the path length $l(s, \{e_{se}, e_{ea}\}, t)$ can be determined, as described herein with regards to processes 800 and 1000. As can be appreciated, $l(s, \{e_{se}, e_{ea}\}, t)$ can equal 9. This path length value does not match the predetermined value of 8. Thus, the network management system can select candidate edge $e_{ef}$ (e.g., candidate edge 1105) and the path length $l(s, \{e_{se}, e_{ef}\}, t)$ can be determined. As can be appreciated, $l(s, \{e_{se}, e_{ef}\}, t)$ can equal 8. This path length value matches the predetermined value of 8. Thus, the network management system can append candidate edge 1105 to initial path 1101. As initial path 1101 does not reach the terminal vertex, the network management system can perform another iteration of process 1000.

FIG. 11B depicts a third iteration of process 1000. In this third iteration, the initial path is $\{e_{se}, e_{ef}\}$ (e.g., initial path 1111). The set of candidate edges include the edges connected to vertex f (e.g., $e_{fa}$ and $e_{fb}$). In this example, the network management system can select candidate edge $e_{fa}$ (e.g., candidate edge 1113) and the path length $l(s, \{e_{se}, e_{ef}$ $e_{fa}$}, t) can be determined, as described herein with regards to processes 800 and 1000. In some embodiments, l(s, {$e_{se}$, $e_{ea}$, $e_{fa}$}, t) can be 10. This path length can correspond to the invalid, looping path {$e_{se}$, $e_{ef}$, $e_{fa}$, $e_{ae}$, $e_{ef}$, $e_{fb}$, $e_{bc}$, $e_{cd}$, $e_{db}$, $e_{ba}$, t}. As may be appreciated, such looping paths will never match the predetermined path length. Alternatively, should process 1000 be configured to detect such loops, the network management system may determine that no other paths exist that have the initial path {$e_{se}$, $e_{ef}$, $e_{fa}$}. Accordingly, in such embodiments, l(s, {$e_{se}$, $e_{ea}$, $e_{fa}$}, t) can be an indication that no path could be found (e.g., −1, null, or another suitable indicator). Regardless, the network management system can select candidate edge $e_{fb}$ (e.g., candidate edge 1115) and the path length l(s, {$e_{se}$, $e_{ef}$, $e_{fb}$}, t) can be determined. As can be appreciated, l(s, {$e_{se}$, $e_{ef}$, $e_{fb}$}, t) can equal 8. This path length value matches the predetermined value of 8. Thus, the network management system can append candidate edge 1115 to initial path 1111. As initial path 1111 does not reach the terminal vertex, the network management system can perform another iteration of process 1000.

Figure 12:
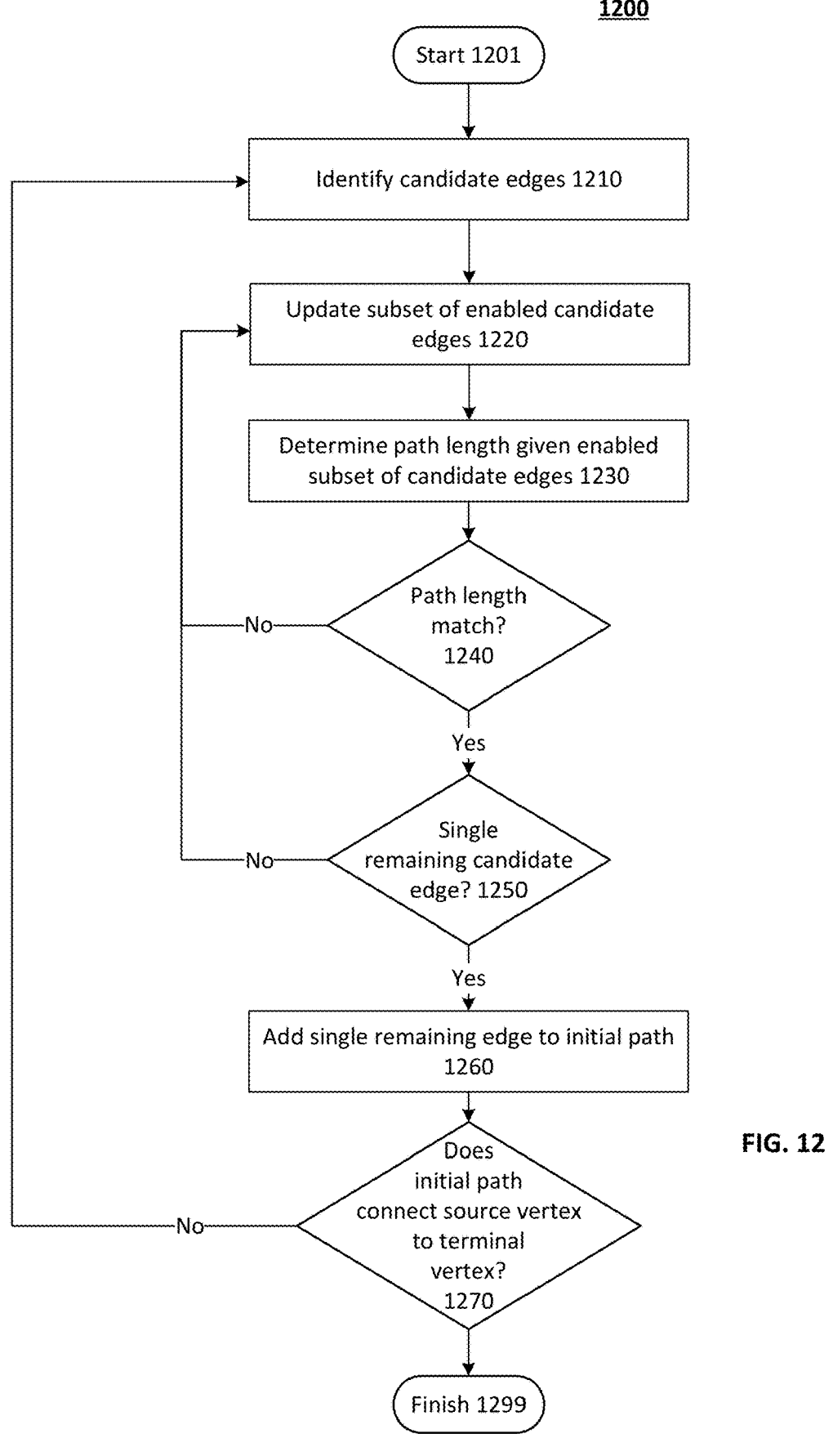
FIG. 12 depicts another exemplary dynamic programming process for determining a valid path, given a predetermined path length, consistent with disclosed embodiments.

FIG. 12 depicts another exemplary dynamic programming process 1200 for determining a valid path, given a predetermined path length, consistent with disclosed embodiments. Process 1200 can include iteratively extending an initial path from the source vertex. In each iteration, candidate edges can be identified. The set of candidate edges can then be iteratively searched by marking a subset of the candidate edges as enabled and determining the path length. The determined path length can be compared to a predetermined path length (e.g., a path length determined using process 800, or the like). If the determined path length matches the predetermined path length, then the subset of the candidate edges contains at least one candidate edge included in a valid path. Otherwise, the complement of the subset must contain all the candidate edges included in any valid path. The subset of enabled candidate edges can be updated based on the comparison. The iterative search can continue until the set of enabled edges includes only a single enabled candidate edge. This edge can be added to the initial path. The initial path can be iteratively extended until it reaches the terminal vertex.

For convenience of description, process 1200 is described herein as being performed by a network management system (e.g., network management system 150, or the like). However, the disclosed embodiments are not so limited. In some embodiments, process 1200 can be performed by another component of the communications network (e.g., one or more of nodes 120, or the like), or another system. Consistent with disclosed embodiments, process 1200 can be performed as part of another process (e.g., process 500, or the like), or as a stand-alone process. For convenience of description, the process 1200 is described as proceeding from the source to the terminal vertex. However, the disclosed embodiments are not so limited. In some embodiments, process 1200 can proceed from the terminal to the source vertex. For convenience of description, the path length is described as a number that is initialized to zero and then incremented to a value equal to the number of edges in a valid path between the source and terminal vertices. However, the disclosed embodiments are not so limited and encompass any functional equivalent to incrementing a number from zero (e.g., starting at a non-zero value, incrementing an alphabetical character, or the like).

In step 1201, process 1200 can start. The network management system can obtain a network graph and a connectivity set. The network graph can have a source vertex and a terminal vertex. The elements of the connectivity set can be associated with elements of a structure. For convenience of description, the connectivity set is described as including valid consecutive edge pairs and edges (e.g., edges connected to the source vertex). However, as described herein, the disclosed embodiments are not so limited. The structure can include an additive identity element and additional elements. The structure can have characteristic two. In some embodiments, the structure can be the field $F_q$, as described herein.

The network management system can obtain a predetermined path length. As described herein, a valid path connecting the source and terminal vertices and having this path length can exist on the network graph. In some embodiments, the network management system can receive or retrieve the predetermined path length from another component of the communication system (e.g., one of nodes 120, database 170, or the like), a user of the communication system, or another system. In some embodiments, the network management system can determine the predetermined path length using another process (e.g., process 800, or the like).

In step 1210 of process 1200, the network management system can identify a set of candidate edges connected to an endpoint of the initial path, consistent with disclosed embodiments. For convenience of description, each iteration of process 1200 is described as beginning when process 1200 reaches step 1210 from step 1201 or step 1270. For example, in an initial iteration, process 1200 can proceed from step 1201 to step 1210. In a subsequent iteration, process 1200 can return from step 1270 to step 1210. In the initial iteration, the initial path can be the null set and the endpoint can be deemed to be the source vertex. The network management system can then select among edges connected to the source vertex. In subsequent iterations, the initial path can exist, and the network management system can select among edges connected to the non-source vertex endpoint of the initial path.

In step 1220 of process 1200, the network management system can update the subset of enabled candidate edges, consistent with disclosed embodiments. Consistent with disclosed embodiments, an initial subset of enabled candidate edges can be selected in the initial iteration. In subsequent iterations, the updating of the enabled candidate edges can depend on whether the determined path length matches the predetermined path length. When the determined path length matches the predetermined path length, the subset of enabled candidate edges can be updated to remove candidate edge(s) from the subset. When the determined path length does not match the predetermined path length, the subset of enabled candidate edges can be updated to replace the candidate edges in the subset with candidate edge(s) in the complement of the subset. In some embodiments, the network management system can perform a binary search of the set of candidate edges.

The disclosed embodiments are not limited to any particular method of indicating enabled candidate edges. In some embodiments, connectivity elements including disabled edges can be removed from the connectivity set. In some embodiments, connectivity elements including disabled edges can be associated with the additive identity element. In some embodiments, enabled edges can be marked as enabled (or disabled edges can be marked as unusable).

In step 1230 of process 1200, the network management system can determine the path length given the enabled subset of candidate edges. In some embodiments, the network management system can use a variant of process 800 to determine the path length.

In an initial iteration of this modified version of process 800, the path length can be initialized to the length of the initial path (e.g., in step 801). The path length can then be incremented (e.g., in step 810) and last edges can be identified (e.g., in step 820). The last edges can be the enabled candidate edges. For each last edge, the vertex connecting the last edge to the final edge in the initial path can be the prior vertex and the other vertex can be the last vertex. The network management system can then determine edge-specific elements for each last edge as follows:

$$f(W_{1+|p|}(s, e_{yz}, z)) = f(W_{|p|}(s, e_{xy}, y)) \cdot f(e_{xy}, e_{yz}) = f(p) \cdot f(e_{xy}, e_{yz})$$

where p is the initial path, $e_{xy}$ is the final edge in the initial path, $e_{yz}$ is the last edge, $|p|$ is the length of the initial path, $f(p)$ is the element of the structure associated with the initial path (e.g., the product of elements associated with the edge pairs in p and the initial edge of p), and $f(e_{xy}, e_{yz})$ is the element of the structure associated with the edge pair connectivity element $\{e_{xy}, e_{yz}\}$. As may be appreciated, subsequent iterations of process 800 can proceed as described with regards to FIG. 8. Upon completion, the variant of process 800 can return a path length or an indication that no path length could be determined. This path length can be denoted $l(s, p, t)$, where s is the source vertex, p is the initial path, and t is the terminal vertex.

In step 1240 of process 1200, the network management system can determine whether $l(s, p, t)$ matches the predetermined path length. If the path lengths do not match (or no path length $l(s, p, t)$ could be determined in step 1020) then process 1200 can return to step 1220. The network management system can then update the subset of enabled candidate edges, replacing the candidate edge(s) in the subset with candidate edge(s) in the complement of the subset. If $l(s, p, t)$ matches the predetermined path length, then process 1200 can proceed to step 1250.

In step 1240 of process 1200, the network management system can determine whether the set of enabled edges includes more than a single remaining edge. If so, then process 1200 can return to step 1220. The network management system can then update the subset of enabled candidate edges, removing candidate edge(s) from the set of enabled candidate edge(s). Otherwise, process 1200 can proceed to step 1260.

In step 1260 of process 1200, the network management system can append the remaining enabled candidate edge to the end of the initial path.

In step 1270 of process 1200, the network management system can determine whether the initial path connects the source vertex to the terminal vertex. If not, then process 1200 can return to step 1210. A new set of candidate paths can be determined, based on the updated initial path. Otherwise, process 1200 can proceed to step 1299.

In step 1299, process 1200 can terminate. In some embodiments, the network management system can return the initial path. The network management system can return the initial path to a user, another component of the communication system, or another system. In some embodiments, the network management system can use the initial path in a subsequent step of another process (e.g., in step 550 of process 500).

Figure 13A:
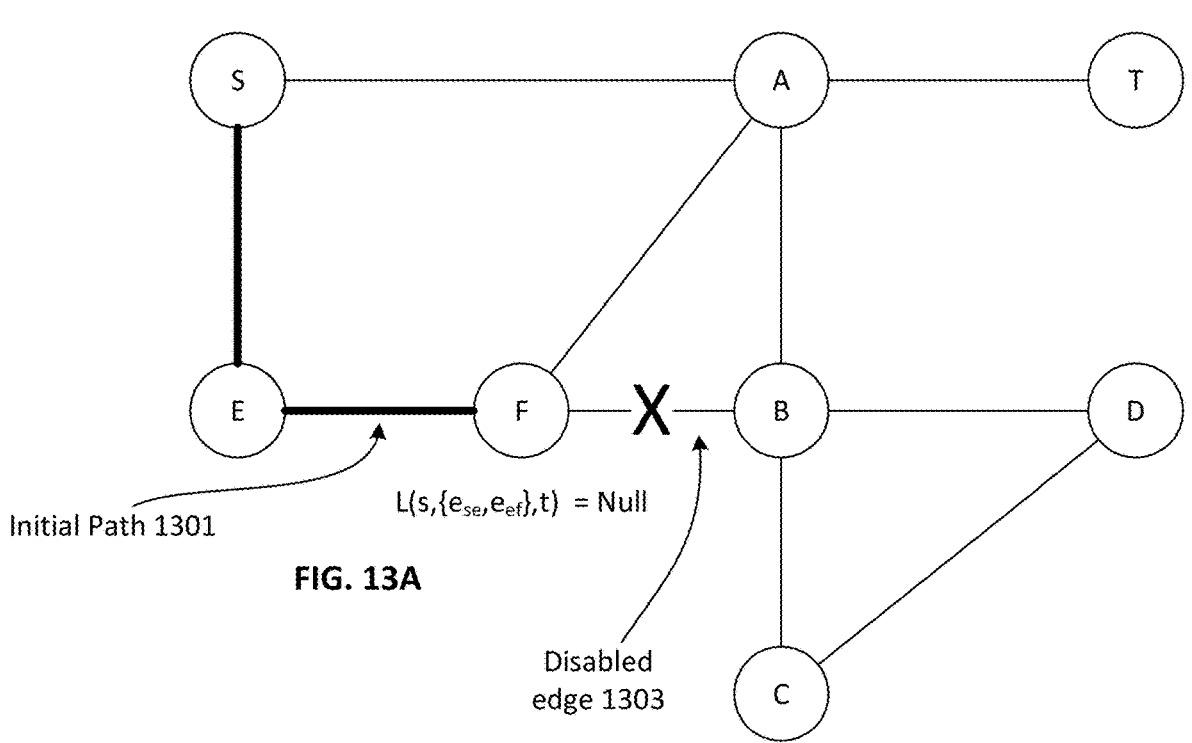
FIGS. 13A and 13B each depict an iteration of the exemplary dynamic programming process of FIG. 12, consistent with disclosed embodiments.
Figure 13B:
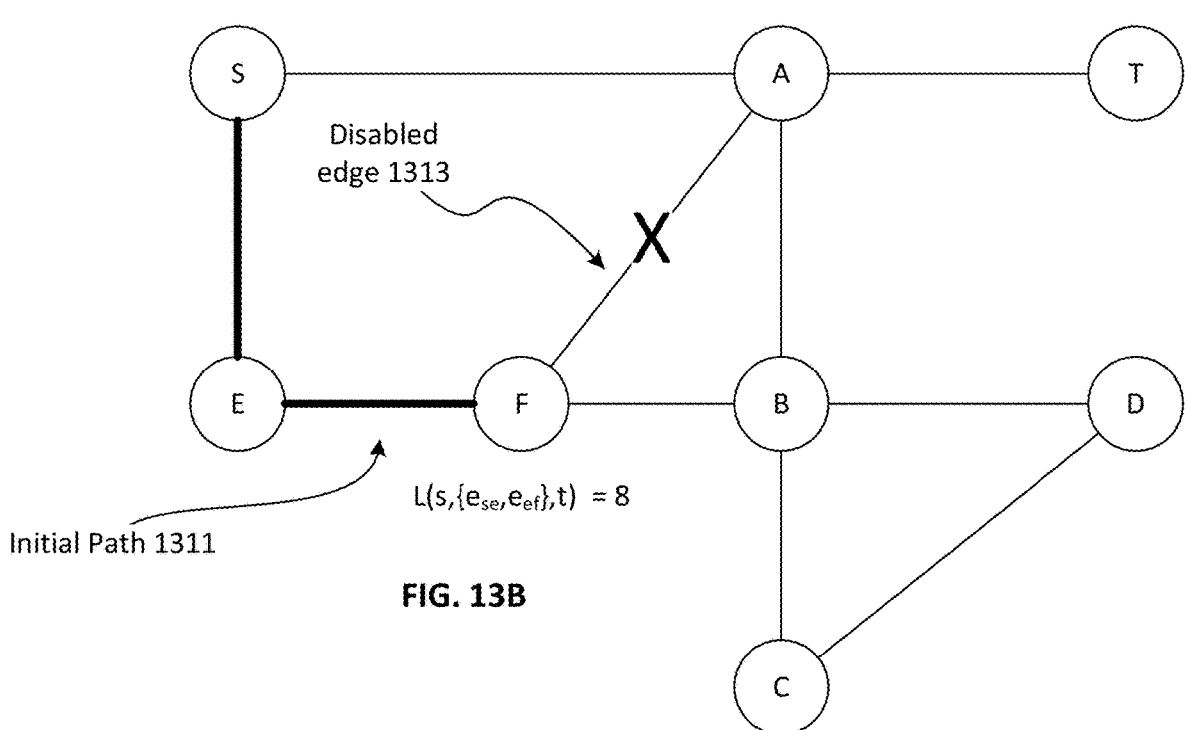

FIGS. 13A and 13B each depict steps in an iteration of the process 1200, consistent with disclosed embodiments. These examples concern a modified version of the network graph depicted in FIGS. 3 and 4. The modified network graph includes an additional edge $e_{fa}$. A modified connectivity set additionally includes the edge pairs $\{e_{ef}, e_{fa}\}$, and $\{e_{fa}, e_{ab}\}$. These modifications do not affect the determination of the shortest path length for which a valid path exists that connects the source vertex s and the terminal vertex t. The shortest path length remains 8 (as determined with regards to FIGS. 9A to 911).

FIG. 13A depicts a first step in the third iteration of process 1200. In this third iteration, the initial path is $\{e_{se}, e_{ef}\}$ (e.g., initial path 1301). In this first step, the set of candidate edges includes the edges connected to vertex f (e.g., $e_{fa}$ and $e_{fb}$). In this example, the network management system can select as the subset of enabled candidate edges $\{e_{fa}\}$ by disabling candidate edge $e_{fb}$ (e.g., disabled edge 1303) and the path length $l(s, \{e_{se}, e_{ef}\}, t)$ can be determined, as described herein with regards to processes 800 and 1000. As can be appreciated, $l(s, \{e_{se}, e_{ea}\}, t)$ can be some suitable indicator the no path could be found (e.g., −1, null, or the like). This path length value does not match the predetermined value of 8.

FIG. 13B depicts a second step in the third iteration of process 1200. The initial path may be 1311. In response to the determination that the path length value did not match the predetermined value of 8, the network management system can update the subset of enabled candidate edges to remove the enabled candidate edge (e.g., $e_{fa}$) and add an edge in the complement of the subset (e.g., $e_{fb}$) by disabling candidate edge $e_{fa}$ (e.g., disabled edge 1313) and enabling candidate edge $e_{fb}$. The network management system can then determine the path length $l(s, \{e_{se}, e_{ef}\}, t)$, as described herein with regards to processes 800 and 1000. As can be appreciated, $l(s, \{e_{se}, e_{ea}\}, t)$ can be 8. This path length value matches the predetermined value of 8. As the subset of enabled candidate edges includes a single edge, then edge can be added to the initial path. As the initial path does not connect the source and terminal vertices, the network management system can perform another iteration of process 1200, using the update initial path.

Figure 14:
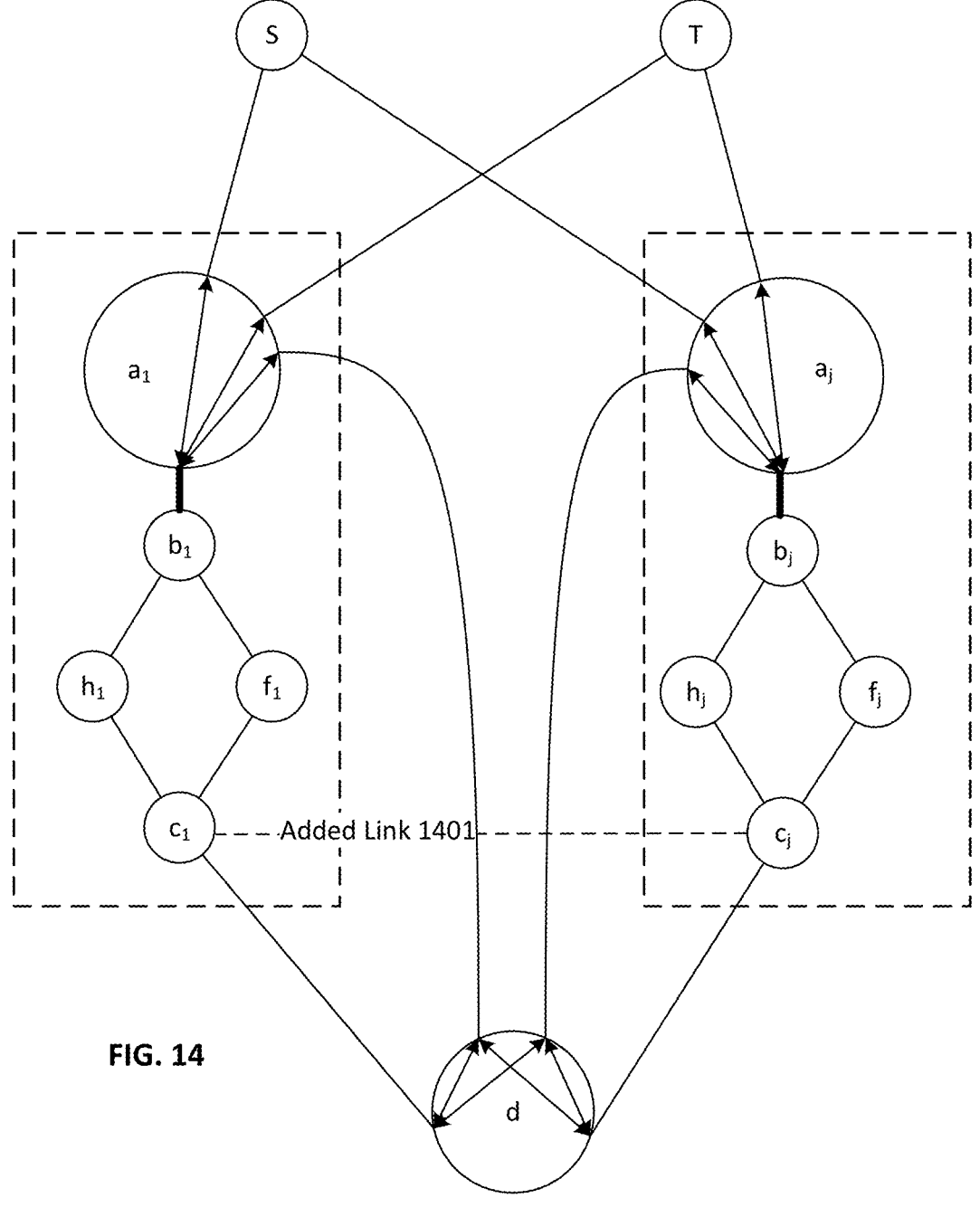
FIG. 14 depicts an exemplary communications network suitable for pathfinding, consistent with disclosed embodiments.

As may be appreciated, pathfinding in large networks with complicated connectivity relationships may be difficult. FIG. 14 depicts an exemplary communications network suitable for pathfinding consistent with disclosed embodiments.

In this example, the large network can be represented by a network graph including a vertex s; a vertex t; a vertex d; and j identical subnetworks (j equal to two is depicted in FIG. 14). The vertex s can be the source vertex of a demand on the large network. The vertex t can be the terminal vertex of the demand. Each subnetwork k can include a vertex $a_k$ connected by edge $sa_k$ to source vertex s, by edge $ta_k$ to terminal vertex t, by edge $a_k b_k$ to vertex $b_k$, and by edge $a_k d_k$ to vertex d, vertex $b_k$ being connected by edge $b_k h_k$ to vertex $h_k$ and by edge $b_k f_k$ to vertex $f_k$, and vertex $c_k$ being connected by edge $c_k h_k$ to vertex $h_k$, by edge $c_k f_k$ to vertex $f_k$, and by edge $c_k d_k$ to vertex d.

A connectivity set can be associated with the network graph. The connectivity set can include all pairs of edges except edge $sa_k$ and edge $ta_k$ for $0<k\leq j$; edge $sa_k$ and edge $a_k d$ for $0<k\leq j$; edge $ta_k$ and edge $a_k d$ for $0<k\leq j$; and edge $c_i d$ and edge $c_k d$ for $0<i<k\leq j$.

A network management system can obtain the network graph and the connectivity set. The network management system can determine, consistent with disclosed embodiments, that no valid path satisfying the demand exists between vertex s and vertex t. In response to determining no path exists, a communication system managing the large network can update the large network to include a communication link corresponding to an edge $c_1 c_m$ for some $l \neq m$ on the network graph and to correspondingly update the network graph (e.g., added link 1401). The connectivity set can be updated to include the pair edge $h_1 c_1$ and edge $c_1 c_m$ and the pair edge $h_m c_m$ and edge $c_j c_m$. The network management system can then determine, consistent with disclosed embodiments, that a valid path satisfying the demand exists between vertex s and vertex t through edge $c_j c_m$.

The disclosed embodiments may further be described using the following clauses:

1. A method for configuring a communications network, comprising: obtaining a network graph representing the communications network, the network graph including vertices corresponding to nodes in the communications network and edges corresponding to communications links in the communications network; obtaining a demand on the network graph, the demand specifying a source vertex of the vertices and a terminal vertex of the vertices; obtaining a connectivity set for the network graph, the connectivity set including elements corresponding to valid pairs of consecutive edges on the network graph; obtaining a structure that lacks zero divisors and includes an additive identity element and additional elements; associating pairs of consecutive edges in the network graph with elements of the structure, the association based in part on the connectivity set; identifying a path length for which some valid path exists between the source vertex and the terminal vertex using the associations between the pairs of consecutive edges and the elements of the structure; determining a valid path of the identified path length on the network graph using the associations between the pairs of consecutive edges and the elements of the structure; and configuring the communications network to satisfy the demand using the valid path.

2. The method of clause 1, wherein: the path length is identified using dynamic programming.

3. The method of any one of clauses 1 to 2, wherein: identifying the path length for which the valid path exists comprises: determining that one of the additional elements in the structure corresponds to the set of paths of the path length between the source vertex and the terminal vertex, the determination based on the additional elements of the structure assigned to the elements of the connectivity set on the paths in the set of paths.

4. The method of any one of clauses 1 to 3, wherein: associating the pairs of consecutive edges in the network graph with the elements of the structure comprises: associating the pairs of consecutive edges included in the connectivity set with ones of the additional elements of the structure.

5. The method of any one of clauses 1 to 4, wherein: the structure is a polynomial field and the element zero is associated with pairs of consecutive edges: absent from the connectivity set; or indicated as invalid connections in the connectivity set.

6. The method of any one of clauses 1 to 4, wherein: the structure comprises a modulus field constructed by an irreducible polynomial over the set of all polynomials over a binary field.

7. The method of clause 6, wherein: obtaining the structure comprises selecting an order of the irreducible polynomial to satisfy a false negative probability criterion.

8. The method of any one of clauses 1 to 7, wherein: identifying the path length for which the valid path exists comprises: determining the additive identity element in the structure corresponds to the set of paths of the path length between the source vertex and the terminal vertex; reassigning the additional elements in the structure to the elements of the connectivity set; and determining one of the additional elements in the structure corresponds to the set of paths of the path length between the source vertex and the terminal vertex, the determination based partly on the reassigned additional elements of the structure.

9. The method of any one of clauses 1 to 7, wherein: identifying the path length comprises: determining an element of the structure corresponding to a first set of paths that start at the source vertex, end at a first intermediate vertex, pass through a first edge connecting a second intermediate vertex and the first intermediate vertex, and have a first path length, the determination comprising: determining an element of the structure corresponding to a second set of paths that start at the source vertex, end at the second intermediate vertex, pass through a second edge connecting a third intermediate vertex and the second intermediate vertex, and have a second path length; and determining a product of: the element of the structure corresponding to the second set of paths; and an element of the structure associated with the pair of the first edge and the second edge.

10. The method of any one of clauses 1 to 9, wherein: determining the valid path comprises: selecting an edge in the network graph that connects to an endpoint vertex of an initial path, the initial path starting at the source vertex and ending at the endpoint vertex; determining a second path length for which a second valid path exists between the source vertex and the terminal vertex, the second valid path including the initial path and the selected edge; comparing the path length to the second path length; and adding the selected edge to the initial path based on the comparison.

11. The method of any one of clauses 1 to 9, wherein: determining the valid path comprises: identifying a set of candidate edges connected to an endpoint vertex of an initial path on the network graph, the initial path starting at the source vertex and ending at the endpoint vertex; iteratively searching the set of candidate edges for a valid candidate edge; and concatenating the initial path and the valid candidate edge.

12. The method of clause 11, wherein: an iteration of the iterative search comprises: determining a second path length for which a second valid path exists between the source vertex and the terminal vertex, the second valid path including the initial path concatenated with one of an enabled subset of the candidate edges; updating the enabled subset of the candidate edges when the enabled subset of the candidate edges includes multiple edges or the path length differs from the second path length; and selecting, when the enabled subset of the candidate edges includes a single edge and the path length equals the second path length, the single edge as the valid candidate edge.

13. A non-transitory, computer-readable medium containing instructions that, when executed by at least one processor of a system, cause the system to perform the method of any one of clauses 1 to 12.

14. A system comprising: at least one processor; and at least one non-transitory, computer-readable medium containing instructions that, when executed by the at least one processor, cause the system to perform the method of any one of clauses 1 to 12.

15. A method, comprising: obtaining a network graph representing a communications network, the network graph including: a source vertex s; a terminal vertex t; a vertex d; and j identical subnetworks, each subnetwork k including a vertex $a_k$ connected by edge $sa_k$ to source vertex s, by edge $ta_k$ to terminal vertex t, by edge $a_k b_k$ to vertex $b_k$, and by edge $a_k d_k$ to vertex d, vertex $b_k$ being connected by edge $b_k h_k$ to vertex $h_k$ and by edge $b_k f_k$ to vertex $f_k$, and vertex $c_k$ being connected by edge $c_k h_k$ to vertex $h_k$, by edge $c_k f_k$ to vertex $f_k$, and by edge $c_k d_k$ to vertex d; obtaining a connectivity set for the network graph, the connectivity set including all pairs of edges except: edge $sa_k$ and edge $ta_k$ for $0<k\leq j$; edge $sa_k$ and edge $a_k d$ for $0<k\leq j$; edge $ta_k$ and edge $a_k d$ for $0<k\leq j$; and edge $c_i d$ and edge $c_k d$ for $0<i<k\leq j$; obtaining a demand from the source vertex s to the terminal vertex t; determining no path satisfying the demand exists; in response to determining no path exists, updating the graph to include an edge $c_i c_m$ for some $l\neq m$, and the connectivity set to include the pair edge $h_l c_l$ and edge $c_i c_m$ and the pair edge $h_m c_m$ and edge $c_i c_m$; and determining a path satisfying the demand exists through edge $c_i c_m$.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

What is claimed is:

1. A method for configuring a communications network, comprising:
  obtaining a network graph representing the communications network, the network graph including vertices corresponding to nodes in the communications network and edges corresponding to communications links in the communications network;
  obtaining a demand on the network graph, the demand specifying a source vertex of the vertices and a terminal vertex of the vertices;
  determining a valid path from the source vertex to the terminal vertex, the determination comprising:
    identifying a path length for which some valid path exists between the source vertex and the terminal vertex using a structure lacking zero divisors and a connectivity set for the network graph, wherein communicatively connected consecutive pairs of communication links in the communications network are each associated with an element of the connectivity set; and
    determining a valid path of the identified path length on the network graph using the connectivity set; and
  configuring one or more components of the communications network to implement a route that satisfies the demand using the valid path.

2. The method of claim 1, wherein:
the structure includes an additive identity element and additional elements.

3. The method of claim 1, wherein:
the structure comprises a modulus field constructed by an irreducible polynomial over the set of all polynomials over a binary field.

4. The method of claim 3, wherein:
an order of the irreducible polynomial is selected, at least in part, to satisfy a false negative probability criterion.

5. The method of claim 1, wherein:
the path length is identified using dynamic programming.

6. The method of claim 1, wherein:
identifying the path length for which the valid path exists comprises:
  determining an element of the structure, the element corresponding to a set of paths of the path length between the source vertex and the terminal vertex.

7. The method of claim 6, wherein:
based on the element being an additive identity element of the structure, identifying the path length for which the valid path exists further comprises:
  updating an association of elements of the structure with elements of the connectivity set; and
  determining an updated element of the structure, the updated element corresponding to the set of paths of the path length between the source vertex and the terminal vertex.

8. The method of claim 1, wherein:
determining the valid path of the identified path length comprises:
  selecting an edge in the network graph that connects to an endpoint vertex of an initial path, the initial path starting at the source vertex and ending at the endpoint vertex;
  determining a second path length for which a second valid path exists between the source vertex and the terminal vertex, the second valid path including the initial path and the selected edge;
  comparing the identified path length to the second path length; and
  adding the selected edge to the initial path based on the comparison.

9. The method of claim 1, wherein:
determining the valid path of the identified path length comprises:
  identifying a set of candidate edges connected to an endpoint vertex of an initial path on the network graph, the initial path starting at the source vertex and ending at the endpoint vertex;
  iteratively searching the set of candidate edges for a valid candidate edge; and
  concatenating the initial path and the valid candidate edge.

10. The method of claim 9, wherein:
an iteration of the iterative search comprises:
  determining a second path length for which a second valid path exists between the source vertex and the terminal vertex, the second valid path including the initial path concatenated with one of an enabled subset of the candidate edges;
  updating the enabled subset of the candidate edges when the enabled subset of the candidate edges includes multiple edges or the path length differs from the second path length; and
  selecting, when the enabled subset of the candidate edges includes a single edge and the identified path length equals the second path length, the single edge as the valid candidate edge.

11. A non-transitory, computer-readable medium containing instructions that, when executed by at least one processor of a system, cause the system to perform operations for configuring a communications network, the operations comprising:
  obtaining a network graph representing the communications network, the network graph including vertices corresponding to nodes in the communications network and edges corresponding to communications links in the communications network;

obtaining a demand on the network graph, the demand specifying a source vertex of the vertices and a terminal vertex of the vertices;

determining a valid path from the source vertex to the terminal vertex, the determination comprising:

identifying a path length for which some valid path exists between the source vertex and the terminal vertex using a structure lacking zero divisors and a connectivity set for the network graph, wherein communicatively connected consecutive pairs of communication links in the communications network are each associated with an element of the connectivity set; and determining a valid path of the identified path length on the network graph using the connectivity set; and configuring one or more components of the communications network to implement a route that satisfies the demand using the valid path.

12. The non-transitory, computer-readable medium of claim 11, wherein:

the structure includes an additive identity element and additional elements.

13. The non-transitory, computer-readable medium of claim 11, wherein:

the structure comprises a modulus field constructed by an irreducible polynomial over the set of all polynomials over a binary field.

14. The non-transitory, computer-readable medium of claim 13, wherein:

an order of the irreducible polynomial is selected, at least in part, to satisfy a false negative probability criterion.

15. The non-transitory, computer-readable medium of claim 11, wherein:

the path length is identified using dynamic programming.

16. The non-transitory, computer-readable medium of claim 11, wherein:

identifying the path length for which the valid path exists comprises:

determining an element of the structure, the element corresponding to a set of paths of the path length between the source vertex and the terminal vertex.

17. The non-transitory, computer-readable medium of claim 16, wherein:

based on the element being an additive identity element of the structure, identifying the path length for which the valid path exists further comprises:

updating an association of elements of the structure with elements of the connectivity set; and determining an updated element of the structure, the updated element corresponding to the set of paths of the path length between the source vertex and the terminal vertex.

18. The non-transitory, computer-readable medium of claim 16, wherein:

determining the valid path of the identified path length comprises:

selecting an edge in the network graph that connects to an endpoint vertex of an initial path, the initial path starting at the source vertex and ending at the endpoint vertex;

determining a second path length for which a second valid path exists between the source vertex and the terminal vertex, the second valid path including the initial path and the selected edge;

comparing the identified path length to the second path length; and adding the selected edge to the initial path based on the comparison.

19. The non-transitory, computer-readable medium of claim 11, wherein:

determining the valid path of the identified path length comprises:

identifying a set of candidate edges connected to an endpoint vertex of an initial path on the network graph, the initial path starting at the source vertex and ending at the endpoint vertex;

iteratively searching the set of candidate edges for a valid candidate edge; and concatenating the initial path and the valid candidate edge.

20. The non-transitory, computer-readable medium of claim 19, wherein:

an iteration of the iterative search comprises:

determining a second path length for which a second valid path exists between the source vertex and the terminal vertex, the second valid path including the initial path concatenated with one of an enabled subset of the candidate edges;

updating the enabled subset of the candidate edges when the enabled subset of the candidate edges includes multiple edges or the path length differs from the second path length; and selecting, when the enabled subset of the candidate edges includes a single edge and the identified path length equals the second path length, the single edge as the valid candidate edge.

* * * * *